United States Patent
Ogasahara

(10) Patent No.: US 9,913,234 B2
(45) Date of Patent: Mar. 6, 2018

(54) FREQUENCY DEVIATION COMPENSATION SCHEME, FREQUENCY DEVIATION COMPENSATION METHOD, AND STORAGE MEDIUM

(71) Applicant: NEC Corporation, Minato-ku, Tokyo (JP)

(72) Inventor: Daisaku Ogasahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/910,039

(22) PCT Filed: Jul. 22, 2014

(86) PCT No.: PCT/JP2014/003847
§ 371 (c)(1),
(2) Date: Feb. 4, 2016

(87) PCT Pub. No.: WO2015/025468
PCT Pub. Date: Feb. 26, 2015

(65) Prior Publication Data
US 2016/0183211 A1    Jun. 23, 2016

(30) Foreign Application Priority Data
Aug. 21, 2013  (JP) .................................. 2013-171048

(51) Int. Cl.
*H04L 27/16* (2006.01)
*H04W 56/00* (2009.01)
(Continued)

(52) U.S. Cl.
CPC ........ *H04W 56/0035* (2013.01); *H04B 10/61* (2013.01); *H04J 11/00* (2013.01);
(Continued)

(58) Field of Classification Search
CPC ........... H04W 56/0035; H04W 72/0453; H04J 11/00; H04L 27/2657; H04L 27/2697; H04B 10/61
(Continued)

(56) References Cited

U.S. PATENT DOCUMENTS 6,038,267 A * 3/2000 Oura ......................... H04L 1/06
329/304
6,370,188 B1 * 4/2002 Wu ..................... H04L 27/2657
375/222
(Continued)

FOREIGN PATENT DOCUMENTS

JP    2010-268210 A    11/2010
JP    2011-009956 A    1/2011
(Continued)

OTHER PUBLICATIONS

Z. Tao et al., "Simple, Robust, and Wide-Range Frequency Offset Monitor for Automatic Frequency Control in Digital Coherent Receivers", 2007 33rd European Conference and Exhibition of Optical Communication (ECOC2007).
(Continued)

*Primary Examiner* — Siu Lee

(57) ABSTRACT

Because a phase offset occurs between adjoining input blocks of multiple divided blocks when the amount of frequency deviation compensation is dynamically changed, there is the possibility that a restored bit string contains an error. This frequency deviation compensation scheme is equipped with: a frequency deviation compensation means for compensating for a frequency deviation in a frequency-domain signal; and a phase offset compensation means for compensating for a phase offset caused to the signal due to change in an amount of compensation during the frequency compensation.

12 Claims, 17 Drawing Sheets

(51) Int. Cl.
*H04B 10/61* (2013.01)
*H04J 11/00* (2006.01)
*H04L 27/26* (2006.01)
*H04W 72/04* (2009.01)

(52) U.S. Cl.
CPC ...... *H04L 27/2657* (2013.01); *H04L 27/2697* (2013.01); *H04W 72/0453* (2013.01)

(58) Field of Classification Search
USPC ........ 375/316, 344, 340, 354, 371, 373, 375
See application file for complete search history.

(56) References Cited

U.S. PATENT DOCUMENTS

| | | | | |
|---|---|---|---|---|
| 2007/0268976 | A1* | 11/2007 | Brink | H04B 1/7183 375/260 |
| 2007/0294738 | A1* | 12/2007 | Kuo | H04N 21/4263 725/116 |
| 2009/0044072 | A1* | 2/2009 | Oh | H04L 12/189 714/758 |
| 2011/0129041 | A1* | 6/2011 | Ishihara | H04B 7/084 375/340 |
| 2012/0087680 | A1* | 4/2012 | Xie | H04B 10/60 398/208 |
| 2012/0177383 | A1* | 7/2012 | Tanimura | H04B 10/61 398/158 |
| 2013/0070874 | A1* | 3/2013 | Nakagawa | H04B 7/10 375/323 |
| 2015/0372766 | A1* | 12/2015 | Yoshida | H04B 10/2507 398/193 |
| 2016/0285936 | A1* | 9/2016 | Choi | H04L 65/601 |

FOREIGN PATENT DOCUMENTS

| | | |
|---|---|---|
| JP | 2011-166627 A | 8/2011 |
| JP | 4872003 B2 | 2/2012 |
| JP | 2013-162166 A | 8/2013 |
| JP | 2014-045426 A | 3/2014 |
| WO | 2012/111847 A1 | 8/2012 |
| WO | 2013/124986 A1 | 8/2013 |

OTHER PUBLICATIONS

International Search Report for PCT Application No. PCT/JP2014/003847, dated Aug. 26, 2014.
English translation of Written opinion for PCT Application No. PCT/JP2014/003847.
Communication dated Dec. 19, 2017 from the Japanese Patent Office in counterpart application No. 2015-532689.
R. Kudo, et al., "Two-stage Overlap Frequency Domain Equalization for Long-haul Optical Systems", Conference on Optical Fiber Communication-incudes post deadline papers, 2009. OSA/OFC/NFOEC 2009, US, IEEE, Mar. 22, 2009, pp. 1-3.

* cited by examiner

FREQUENCY DEVIATION COMPENSATION SCHEME, FREQUENCY DEVIATION COMPENSATION METHOD, AND STORAGE MEDIUM

This application is a National Stage Entry of PCT/JP2014/003847 filed on Jul. 22, 2014 which claims priority from Japanese Patent Application 2013-171048 filed on Aug. 21, 2013 the contents of all of which are incorporated herein by reference, in their entirety.

TECHNICAL FIELD

The disclosure herein relates to a frequency deviation compensation scheme, a frequency deviation compensation method, and a storage medium.

BACKGROUND ART

The widespread use of the Internet has led to a rapid increase in traffic volume for backbone communication systems, creating a desire for realization of practical optical communication systems operating at ultra-high speed exceeding 100 Gbps. One technology attracting attention to realize ultrafast optical communication systems is the digital coherent scheme that combines an optical phase modulation scheme with a polarization multiplexing and demultiplexing technique.

PTL 1 and NPL 1 respectively disclose techniques to compensate for a frequency deviation in digital coherent receivers. The invention described in NPL 1 allows for compensation for a frequency deviation by using local oscillation light whose oscillating frequency can be controlled, so as to control the oscillating frequency of local oscillation light in the opposite direction to a frequency deviation estimated value; however, the invention requires a configuration for controlling the oscillating frequency of local oscillation light.

PTL 1 discloses compensation for waveform distortion by performing overlap-type fast Fourier transform (FFT) and inverse fast Fourier transform (IFFT).

The digital coherent receiver described in PTL 1 has circuitry which includes an input unit, an FFT input frame generation unit, an FFT processing unit, a characteristic multiplication unit, an IFFT processing unit, an IFFT output frame extraction unit, and an output unit.

It is assumed here that input data consists of 256 parallel signals and that the window size for FFT and IFFT is 1,024. The input data (time domain: 256 samples) is inputted to the input unit. The input unit buffers the incoming input data and generates a frame consisting of 512 samples every two clocks.

The input unit outputs the generated frame to the FFT input frame generation unit.

The FFT input frame generation unit generates, with respect to sample frames outputted from the input unit, a frame consisting of 1,024 samples by combining the current 512-sample frame with the immediately preceding 512-sample frame. The FFT input frame generation unit outputs the generated frame to the FFT processing unit.

The FFT processing unit transforms the frame outputted from the FFT input frame generation unit into frequency-domain data. The FFT processing unit outputs the transformed frame to the characteristic multiplication unit. The characteristic multiplication unit multiplies characteristic parameters for each frequency component with respect to the frequencies corresponding to the frame outputted from the FFT processing unit (for 1,024 frequencies). The characteristic parameters are inputted, for example, from an external area. The characteristic multiplication unit outputs the multiplied frame to the IFFT processing unit.

The IFFT processing unit transforms the frame outputted from the characteristic multiplication unit into time-domain data. The IFFT processing unit outputs the transformed frame to the IFFT output frame extraction unit. Discontinuous points are included in the vicinity of the frame outputted from the IFFT processing unit.

Thus, the IFFT output frame extraction unit discards 256 samples each, i.e., a quarter of the window size, from the front and rear of a frame outputted from the IFFT processing unit. If discontinuous points are within the area discarded by the IFFT output frame extraction unit, no discontinuous points are generated in the output obtained by joining 512 samples that have not been discarded. The IFFT output frame extraction unit outputs the processed frame to the output unit.

The output unit takes out every 256 samples per one clock from a frame (512 samples outputted every two clocks) outputted from the IFFT output frame extraction unit and outputs them to the subsequent stage in the form of parallel signals.

The digital coherent receiver described in PTL 1 includes circuitry for performing the overlap-type FFT and IFFT that handle the above-described processes to prevent discontinuous points from occurring.

CITATION LIST

Patent Literature

[PTL 1] Japanese Unexamined Patent Application Publication No. 2011-9956

Non Patent Literature

[NPL 1] Z. Tao et al., "Simple, Robust, and Wide-Range Frequency Offset Monitor for Automatic Frequency Control in Digital Coherent Receivers", 2007 33rd European Conference and Exhibition of Optical Communication (ECOC2007)

SUMMARY OF INVENTION

Technical Problem

In the case where the digital coherent receiver compensates for a frequency deviation in a received optical signal, it is desirable to have the capability to change an amount of compensation because a frequency deviation in such received optical signal fluctuates over time during operation.

However, supposing that the overlap-type FFT and IFFT described in PTL 1 is used to compensate for a frequency deviation, a phase offset will occur between the frame generated for dividing input signals into a plurality of groups and the immediately preceding or following frame if an amount of frequency deviation compensation is dynamically changed. Consequently there arises a problem of generating an error in the final bit string recovered in the digital coherent receiver. In particular, there is even a risk of temporarily interrupting communications if the employed communication mode is not differential coding.

An object of exemplary embodiments of the present invention is to provide a frequency deviation compensation scheme or the like that solves the above-described problem and prevents errors that may be caused due to a phase offset, even when an amount of frequency deviation compensation is dynamically changed. It should be noted that this object is one of a plurality of objects to be achieved by exemplary embodiments disclosed herein. Other objects or problems and novel features will be apparent from descriptions herein or the accompanying drawings.

Solution to Problem

A frequency deviation compensation scheme according to an exemplary embodiment includes: frequency deviation compensation means which compensates for a frequency deviation in a frequency-domain signal; and phase offset compensation means which compensates for a phase offset caused to the signal due to change in an amount of compensation during the frequency compensation.

A method for compensating for a frequency deviation according to an exemplary embodiment includes: compensating for a frequency deviation in a frequency-domain signal; and compensating for a phase offset caused to the signal due to change in an amount of compensation during the frequency compensation.

A storage medium according to an exemplary embodiment stores a program for causing a computer to execute the processes of: compensating for a frequency deviation in a frequency-domain signal; calculating a phase offset caused to the signal due to change in an amount of compensation during the frequency compensation; and compensating for the phase offset of the signal based on the calculated phase offset.

Advantageous Effects of Invention

Exemplary embodiment of the present invention provide the effect of preventing errors that may be caused due to a phase offset, even when an amount of frequency deviation compensation is dynamically changed.

DESCRIPTION OF EMBODIMENTS

Figure 1:
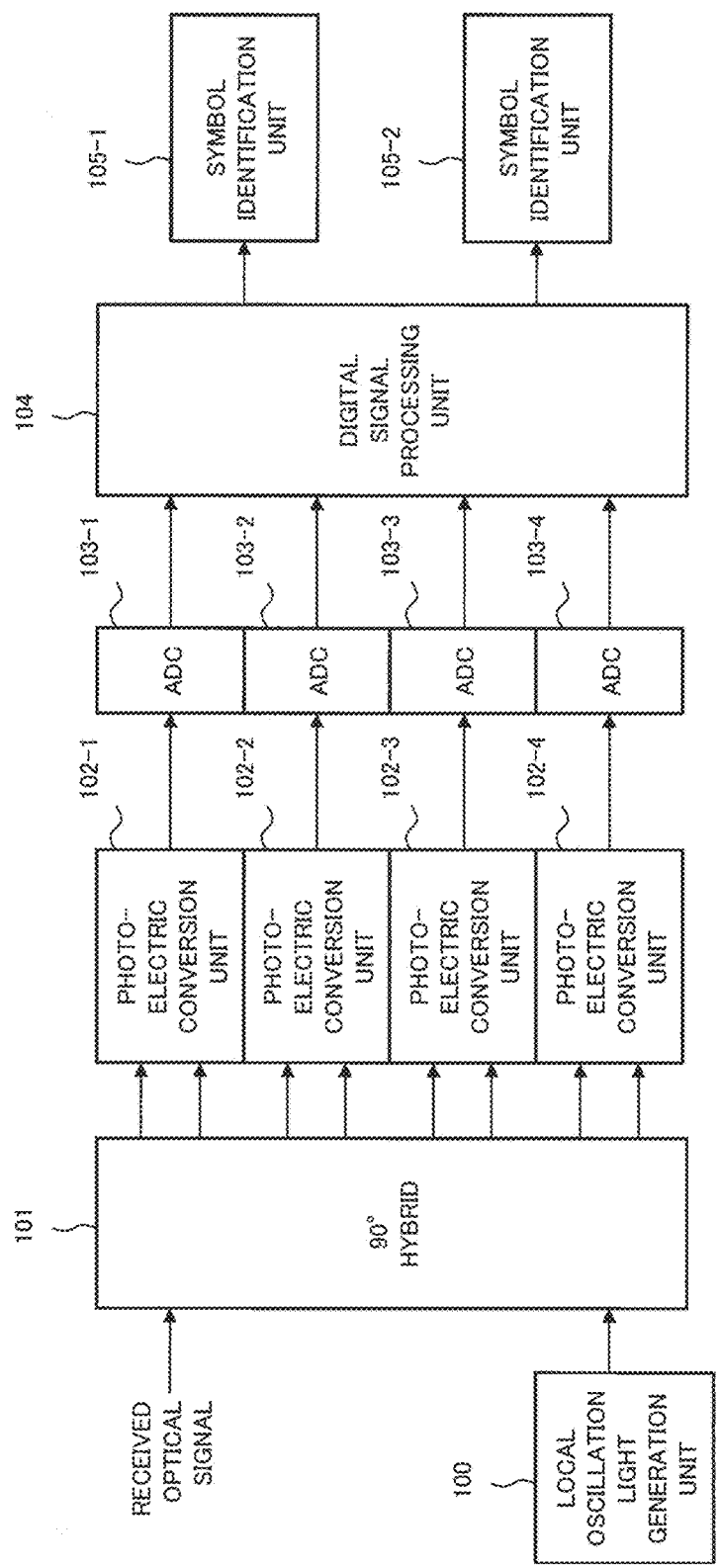
FIG. 1 is a block diagram illustrating an example configuration of a digital coherent optical receiver according to a first exemplary embodiment.

Specific exemplary embodiments will now be described in detail with reference to the drawings. Identical symbols are assigned to the same or corresponding elements throughout the drawings, and for clear explanation duplicate descriptions are omitted as may be necessary.

The following describes a plurality of exemplary embodiments, which may be implemented individually or in combination as appropriate. The plurality of exemplary embodiments individually have their own distinct novel features. Accordingly, each of these plurality of exemplary embodiments contributes to achieving its own distinct objects or solving its own distinct problems, as well as contributing to producing its own effects.

First Exemplary Embodiment

A first exemplary embodiment will now be described in detail with reference to the drawings. It should be noted that reference symbols in the drawings for this outline are added for convenience to respective elements as an example in order to aid understanding, and that descriptions of this outline are not intended for any limitation.

To begin with, the digital coherent system is described with reference to the drawings.

Note that the frequency deviation compensation means corresponds to the frequency shift unit 405. Also note that the frequency deviation calculation means corresponds to the frequency deviation rough estimation unit 401.

One technology attracting attention to realize ultrafast optical communication systems is the digital coherent scheme that combines an optical phase modulation scheme with a polarization multiplexing and demultiplexing technique.

The optical phase modulation scheme is a scheme for data modulation imposed on the phase of transmitted laser light, not on the optical intensity of transmitted laser light as in the optical intensity modulation scheme. For example, QPSK (Quadruple Phase Shift Keying) and 16QAM (16 Quadrature Amplitude Modulation) are well-known optical phase modulation schemes.

According to the polarization multiplexing and demultiplexing technique, in an optical transmitter, optical carrier waves are deployed in a single frequency band and two independent single-polarization optical signals whose polarization states are orthogonal to each other are polarization-multiplexed, whereas in an optical receiver, a received optical signal is separated into these two independent single-polarization optical signals. This enables the polarization multiplexing and demultiplexing technique to double a transmission speed.

FIG. 1 is a block diagram illustrating an example configuration of an optical receiver that is based on the digital coherent scheme. A received optical signal is inputted to 90° hybrid 101 along with local oscillation light that is transmitted from a local oscillation light generation unit 100 and shares the same frequency band with the received optical signal. Note that a frequency value for optical signals on the transmitter side and a frequency value for local oscillation light on the receiver side are predetermined by, for example, the administrator, who makes settings of these frequencies to the respective light sources. For example, the local oscillation light generation unit 100 transmits local oscillation light of a preset frequency. Eight optical signals outputted from the 90° hybrid 101 are converted into electrical signals through photo-electric conversion units 102-1 to 102-4, and then converted from analog signals into digital signals through AD converters (ADCs; Analog-to-Digital Converters) 103-1 to 103-4. Four digital signals generated in this way correspond to the real part and imaginary part of a signal component (X polarization signal) parallel with the polarizing axis of the 90° hybrid 101, and the real part and imaginary part of a signal component (Y polarization signal) orthogonal to the polarizing axis of the 90° hybrid 101, respectively, of the received optical signal. The digital signals generated by the ADCs 103-1 to 103-4 undergo demodulation through a digital signal processing unit 104, and finally bit strings are recovered in symbol identification units 105-1 and 105-2.

The following provides detail descriptions of digital signal processing operations performed in the optical receiver based on the digital coherent scheme.

Figure 2:
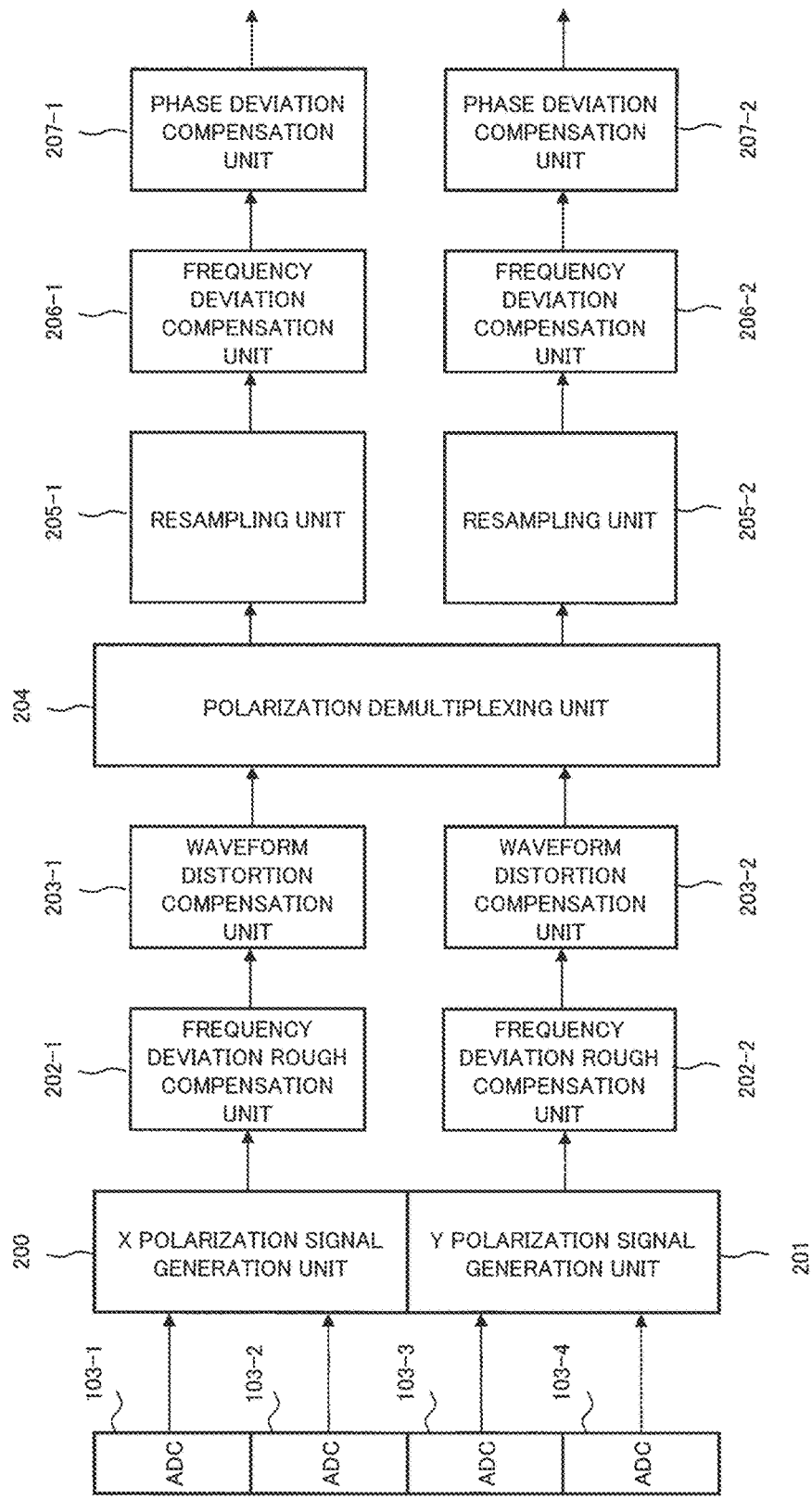
FIG. 2 is a block diagram illustrating an example configuration of a digital signal processing unit according to the first exemplary embodiment.

FIG. 2 is a block diagram illustrating an example configuration of a digital signal processing unit 104. An X polarization signal represented as a complex number is generated from the digital signals inputted to an X polarization signal generation unit 200 from the ADCs 103-1 and 103-2. Similarly, a Y polarization signal represented as a complex number is generated from the digital signals inputted to a Y polarization signal generation unit 201 from ADCs 103-3 and 103-4.

Frequency deviation rough compensation units 202-1 and 202-2 compensate for a deviation between the center frequency of a received optical signal and the oscillating frequency of local oscillation light (optical carrier frequency deviation) with rough accuracy. This rough compensation is performed because a greater amount of optical carrier frequency deviation might cause malfunction in a polarization demultiplexing unit 204 situated in a subsequent stage, depending on the type of the phase modulation scheme used for received optical signals or the optical signal-noise (SN) ratio. In addition, if a matched filter is employed in waveform distortion compensation units 203-1 and 203-2 situated in a subsequent stage, a deviation between the received optical signal and the center frequency of the matched filter might degrade signal quality.

Note that the frequency deviation rough compensation units may be omitted if there is no such problems.

Figure 3:
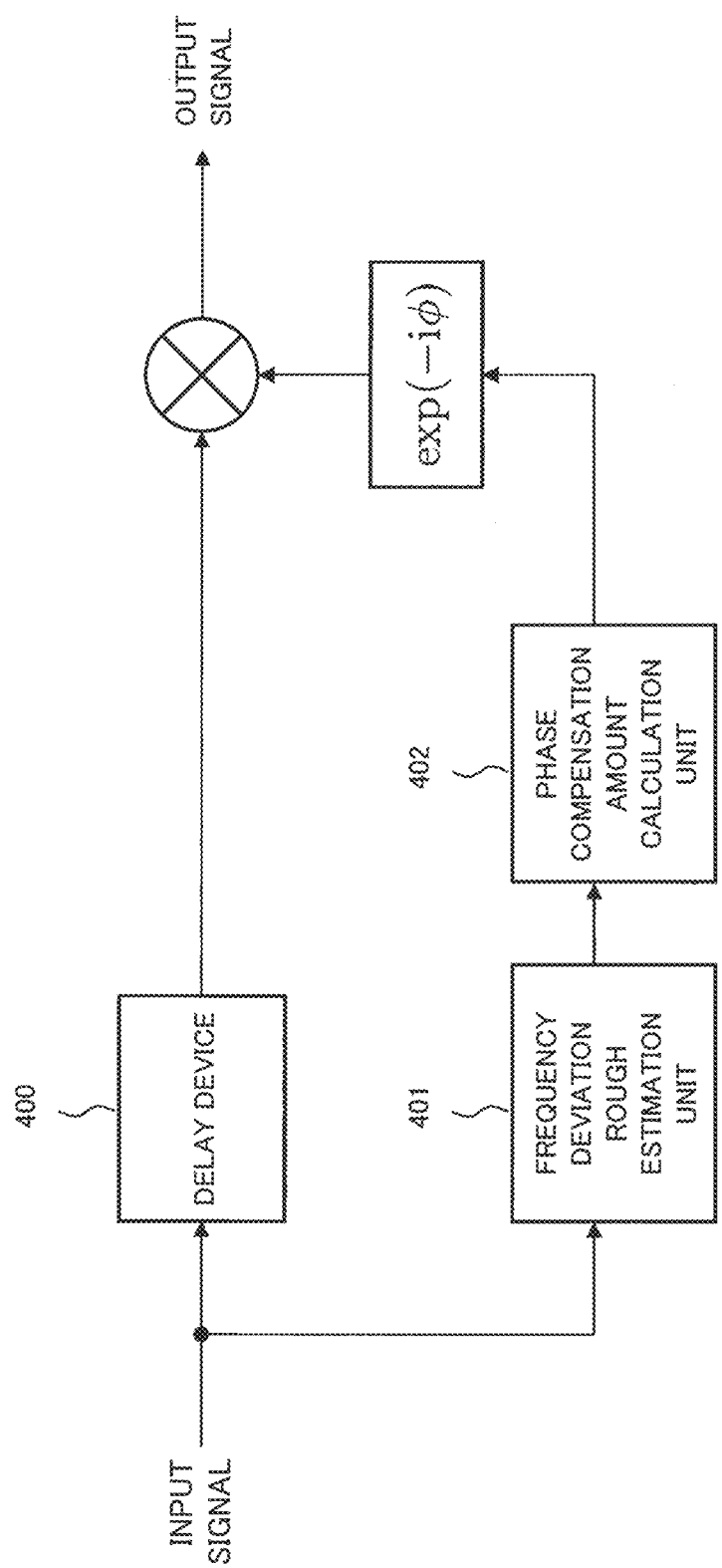
FIG. 3 is a block diagram illustrating an example configuration of a frequency deviation rough compensation unit.

FIG. 3 is a block diagram illustrating an example configuration of the frequency deviation rough compensation unit 202. An input signal is divided into two parts, and then a frequency deviation rough estimation unit 401 uses one part to estimate a frequency deviation and a phase compensation amount calculation unit 402 calculations an amount of phase compensation. The other part of the signal waits in a delay device 400 until an amount of phase compensation is calculated. Note that the frequency deviation rough estimation unit 401 may alternatively apply, for example, the method for roughly estimating a frequency deviation described in NPL 1. The method for roughly estimating a frequency deviation described in NPL 1 will be discussed later herein.

An amount of phase compensation is calculated by obtaining the sum of products of a frequency deviation estimated value and unit sampling times (inverse numbers of sampling rates for ADCs 103-1 to 103-4). Once the amount of phase compensation is calculated, the input signal on standby in the delay device 400 is subjected to frequency deviation compensation through a clockwise phase rotation by the amount of phase compensation. Note that the example configuration described above employs the method for calculating frequency deviation estimated values using one part of a bifurcated input signal, but this is an example only and any frequency deviation estimated value calculated by other methods can be used.

Figure 4:
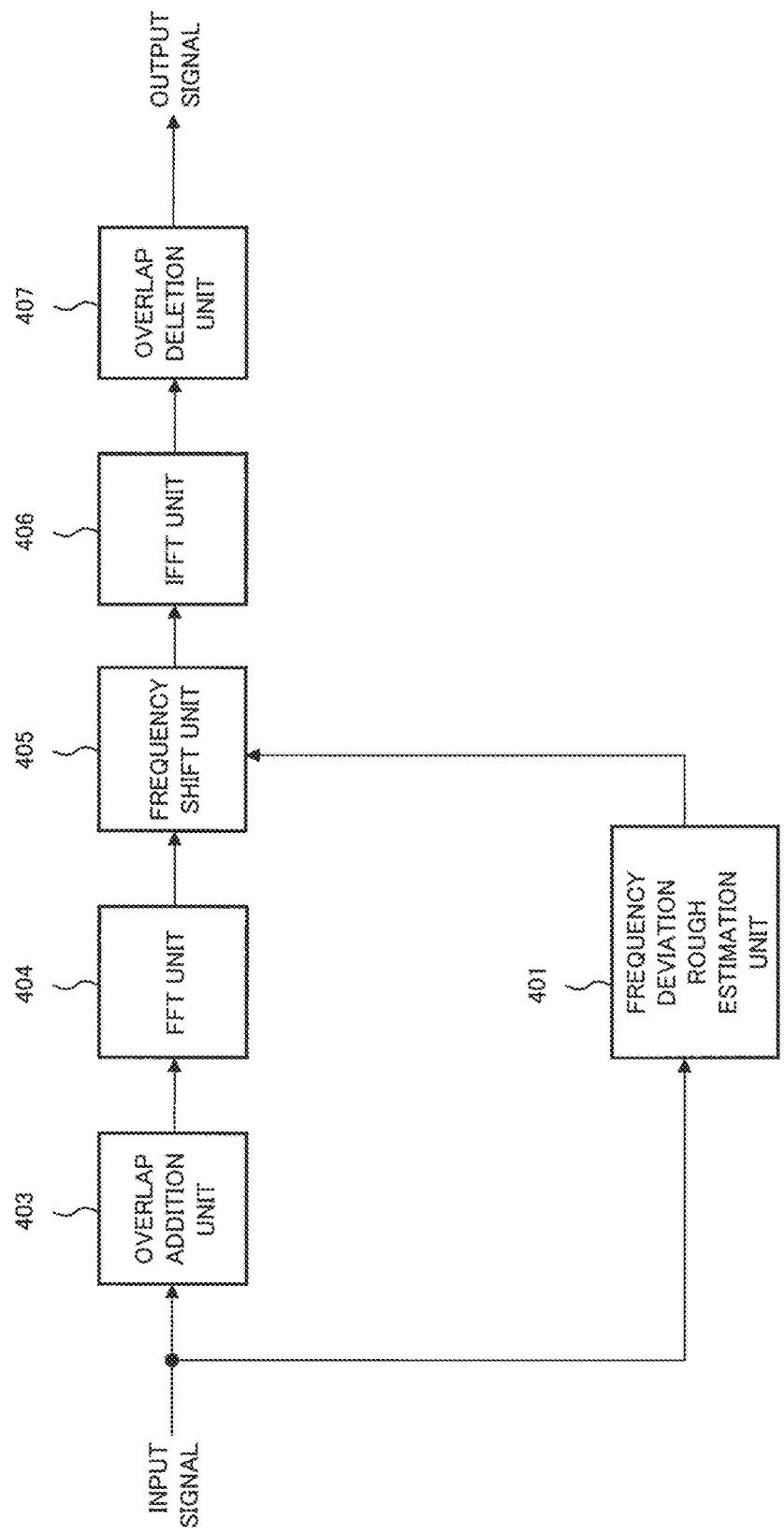
FIG. 4 is a block diagram illustrating another example configuration of the frequency deviation rough compensation unit.

FIG. 4 is a block diagram illustrating another example configuration of the frequency deviation rough compensation unit 202.

As illustrated in FIG. 4, the frequency deviation rough compensation unit 202 may alternatively be configured to compensate for a frequency deviation by shifting an optical spectrum in the frequency direction in the frequency domain. The scheme for compensation performed in the frequency domain as illustrated in FIG. 4 is called Frequency Domain Equalization (FDE). The FDE-based scheme for carrier frequency deviation compensation is very effective in reducing a circuit size, owing to the simple process where data need only be frequency-shifted by the amount of frequency deviation compensation in the frequency direction as well as owing to the capability to simultaneously compensate for other linear distortions.

Figure 5:
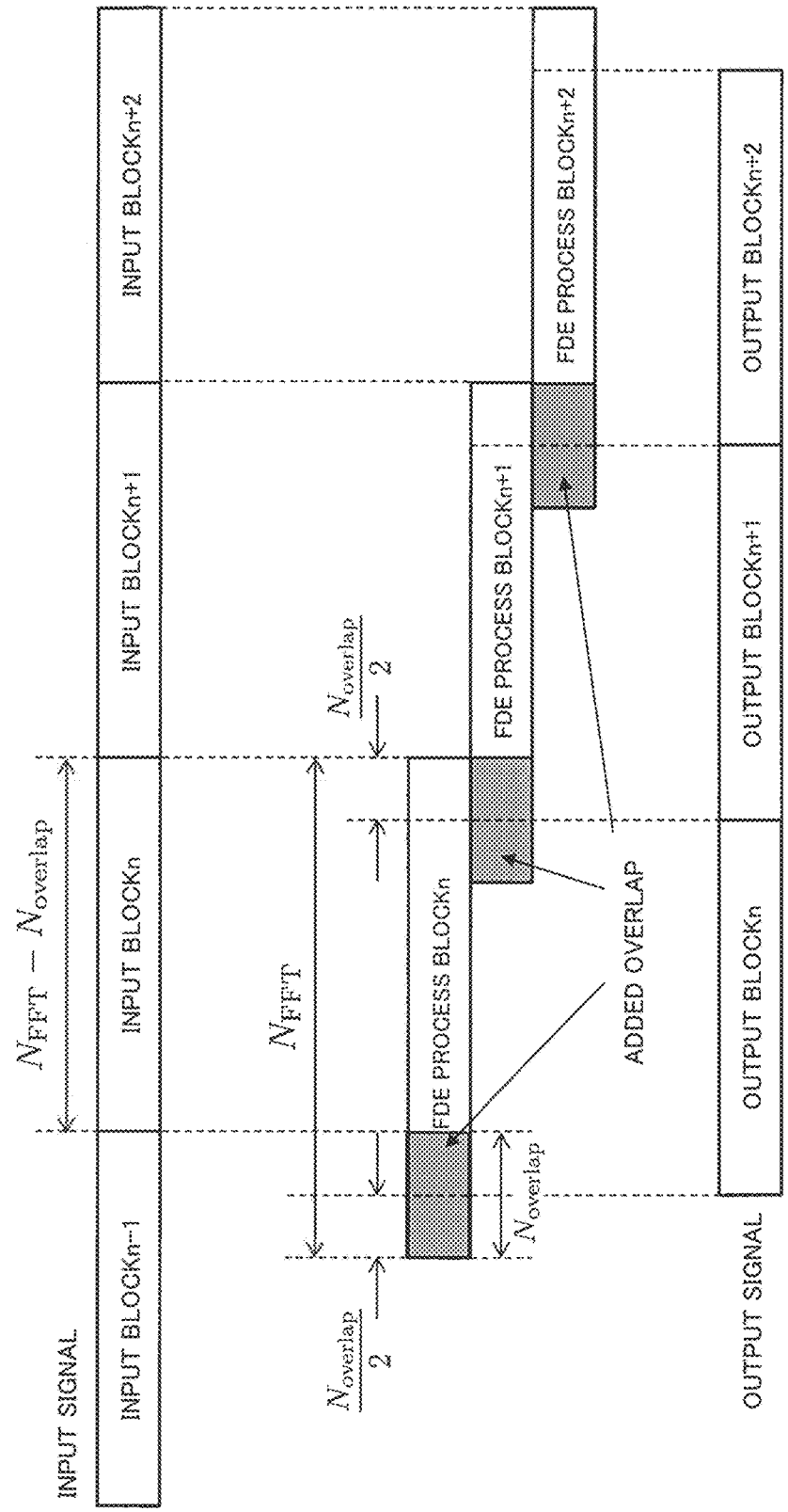
FIG. 5 illustrates example operations of overlap Frequency Domain Equalization (FDE) according to the first exemplary embodiment.

As illustrated in FIG. 5, the FDE-based frequency deviation compensation unit 202 divides an input signal into input blocks of a predetermined length. For each of the input blocks, an overlap addition unit 403 generates an FDE process block whose data length is an FFT/IFFT window size $N_{FFT}$, which contains the input block and additional data of a predetermined length (overlap size $N_{overlap}$) in the latter part of the immediately preceding input block. Each of the generated FDE process blocks undergoes a fast Fourier transform (FFT) performed by an FFT unit 404 to be transformed into a frequency-domain signal.

Then, the post-fast Fourier transform FDE process block is frequency-shifted in the frequency direction opposite to the frequency deviation estimated value. Any data on one of the boarders of an FDE process block deviating from the frequency range as a result of the frequency shift is deleted, whereas zeros are inserted to the opposite boarder of the FDE process block by the amount of a frequency shift, followed by an inverse fast Fourier transform (IFFT) performed by an IFFT unit 406 for re-transform into a time-domain signal.

Finally, an overlap deletion unit 407 deletes data of half the overlap size from the front and the rear, respectively, of an FDE process block and generates resulting output data.

The overlap addition and deletion processes are performed in order to eliminate a computational distortion that may be caused by the assumption in FFT and IFFT that a signal repeats periodically. FDE involving the above-described overlap addition and deletion is called overlap FDE.

Apart from the above-described frequency deviation compensation schemes, in the case where the local oscillation light generation unit 100 capable of controlling oscillating frequencies as described in NPL 1, frequency deviation compensation can also be achieved by controlling the oscillating frequency of local oscillation light in the direction opposite to a frequency deviation estimated value.

Figure 6:
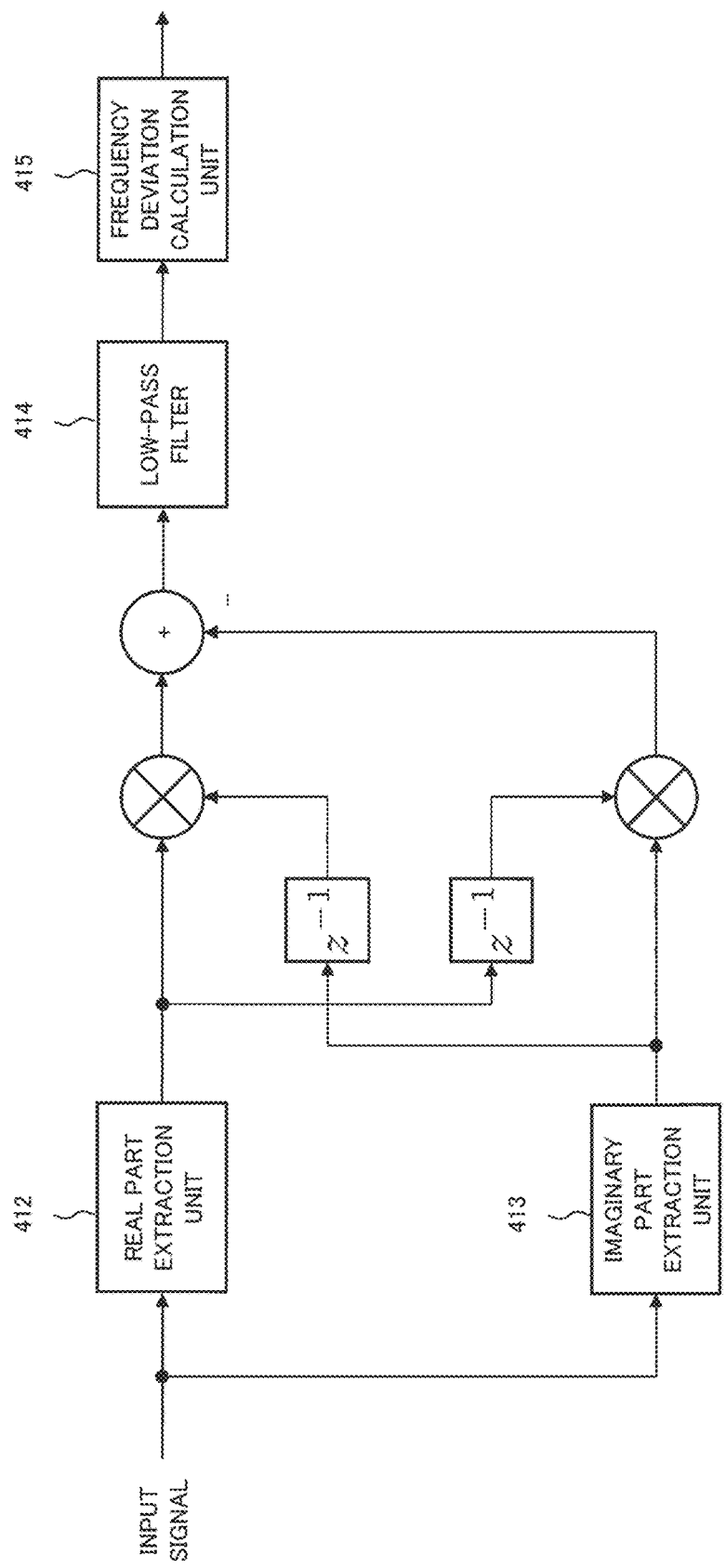
FIG. 6 is a block diagram illustrating an example of the scheme for roughly estimating a frequency deviation as described in NPL 1.

FIG. 6 is a block diagram illustrating an example scheme for roughly estimating a frequency deviation as described in NPL 1. According to the scheme illustrated in FIG. 6, a difference between products of the preceding and following two samples is calculated on each of the real part and the imaginary part of an input signal, and then the signal goes through a low-pass filter 414 such as moving average. The real part of an input signal is extracted by a real part extraction unit 412 whereas the imaginary part of an input signal is extracted by an imaginary part extraction unit 413. As simulations demonstrate that an output value of the low-pass filter is proportional to a frequency deviation as far as they are within a predetermined frequency deviation range, the frequency deviation can be estimated from the output value of the low-pass filter. The frequency deviation is estimated by a frequency deviation calculation unit 415.

Waveform distortion compensation units 203-1 and 203-2 perform various compensation processes on the signals inputted from the frequency deviation rough compensation units 202-1 and 202-2 for improving transmission quality, such as wavelength dispersion compensation, waveform shaping through a matched filter, and non-linear waveform distortion compensation.

The polarization demultiplexing unit 204 separates a received optical signal into digital signals corresponding two independent optical signals that underwent polarization multiplexing in the optical transmitter. Polarization demultiplexing algorithms that can be used include, without limitation, Continuous Modulus Algorithm (CMA) and Decision Decided Least Mean Square (DD-LMS).

The signals each outputted from the polarization demultiplexing unit 204 go through resampling units 205-1 and 205-2 to be converted to a signal oversampled by a factor of 1 with optimized sampling timing. Note that the resampling units 205-1 and 205-2 may be placed elsewhere, such as immediately before the polarization demultiplexing unit 204, provided that signals inputted to frequency deviation compensation units 206-1 and 206-2 have been oversampled by a factor of 1.

The frequency deviation compensation units 206-1 and 206-2 complete compensation for optical carrier frequency deviations which the frequency deviation rough compensation unit 202-1 and 202-2 may have failed to compensate for and then phase deviation compensation units 207-1 and 207-2 compensate for optical phase deviations.

Figure 7:
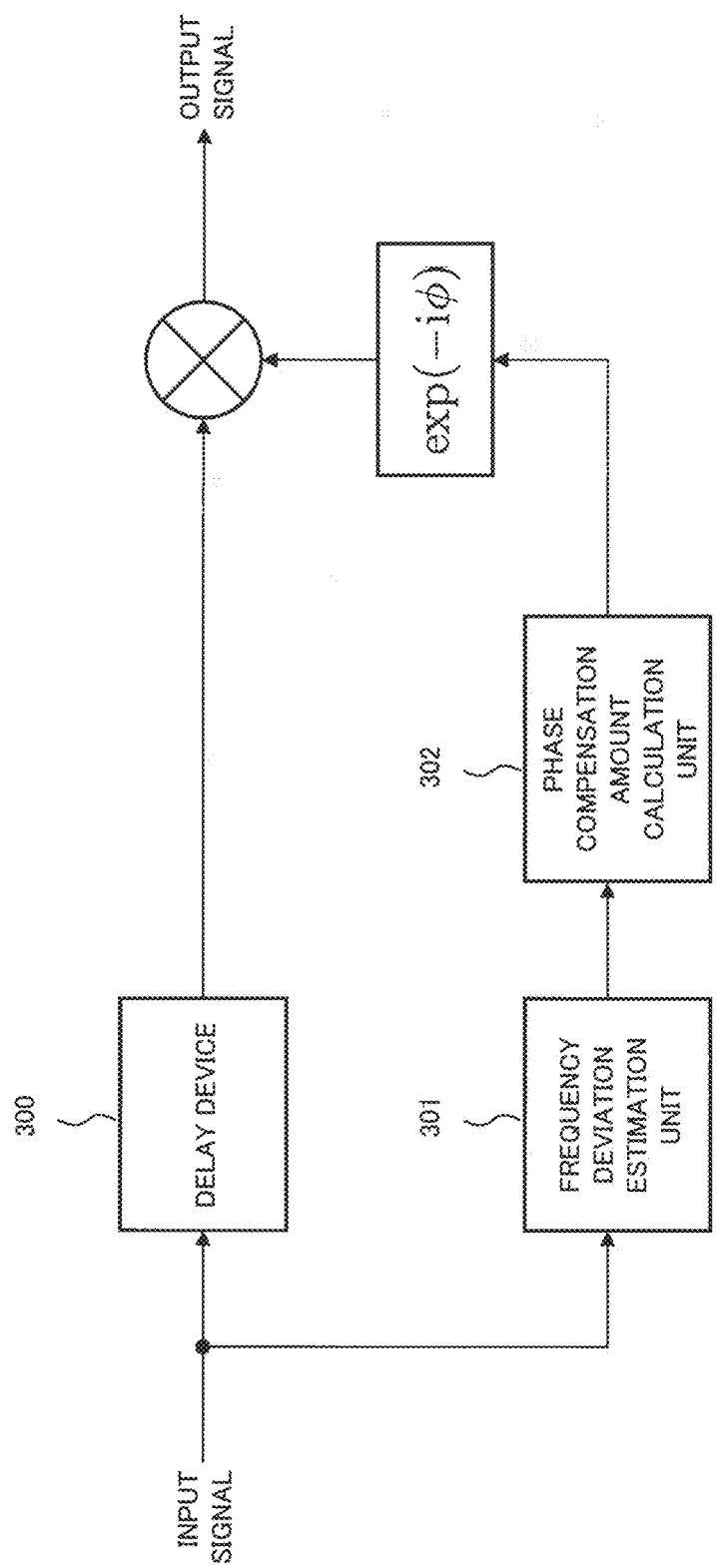
FIG. 7 is a block diagram illustrating an example configuration of the frequency deviation compensation unit according to the first exemplary embodiment.

FIG. 7 is a block diagram illustrating an example configuration of the frequency deviation compensation units 206-1 and 206-2. Similarly to the configuration of the frequency deviation rough compensation unit 202 as illustrated in FIG. 3, the frequency deviation compensation units 206-1 and 206-2 include a delay device 300, a frequency deviation estimation unit 301, and a phase compensation amount calculation unit 302.

Figure 8:
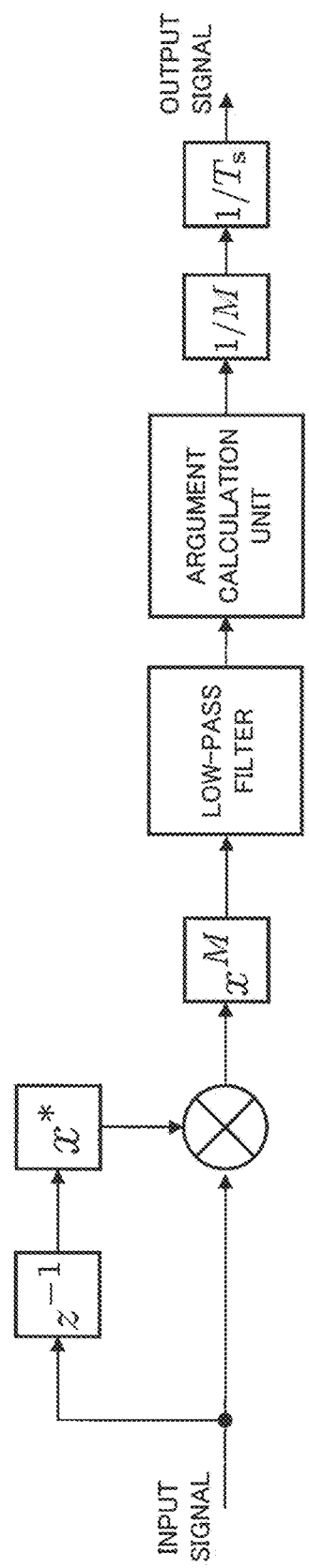
FIG. 8 is a block diagram illustrating an example configuration of a frequency deviation estimation unit according to the first exemplary embodiment.

FIG. 8 is a block diagram illustrating a configuration of the frequency deviation estimation unit 301, which is called M-th power algorithm or Viterbi algorithm. In order to use such algorithm, signals oversampled by a factor of 1 with optimized sampling timing need to be inputted. Since signals oversampled by a factor of 1 are used, there is a limit imposed on a range of frequency deviations that can be compensated for.

The above-described digital coherent scheme that combines an optical phase modulation scheme with a polarization multiplexing and demultiplexing technique can realize a ultrafast, e.g., 100 Gbps, optical communication system.

In a first exemplary embodiment herein, an amount of frequency deviation is dynamically changed during frequency deviation compensation according to the above-described digital coherent scheme. However, if an amount of frequency deviation compensation is dynamically changed in the frequency deviation rough compensation unit 202 illustrated in FIGS. 3, 4, and 6, there will arise a problem of generating an error in the recovered bit string due to a phase offset occurring between adjoining blocks. In particular, there is a risk of temporarily interrupting communications if the employed communication mode is not differential coding.

Thus, the first exemplary embodiment solves the above-described problem by providing a frequency deviation rough compensation unit 202 which includes a phase offset compensation unit and a phase offset amount calculation unit.

Figure 9:
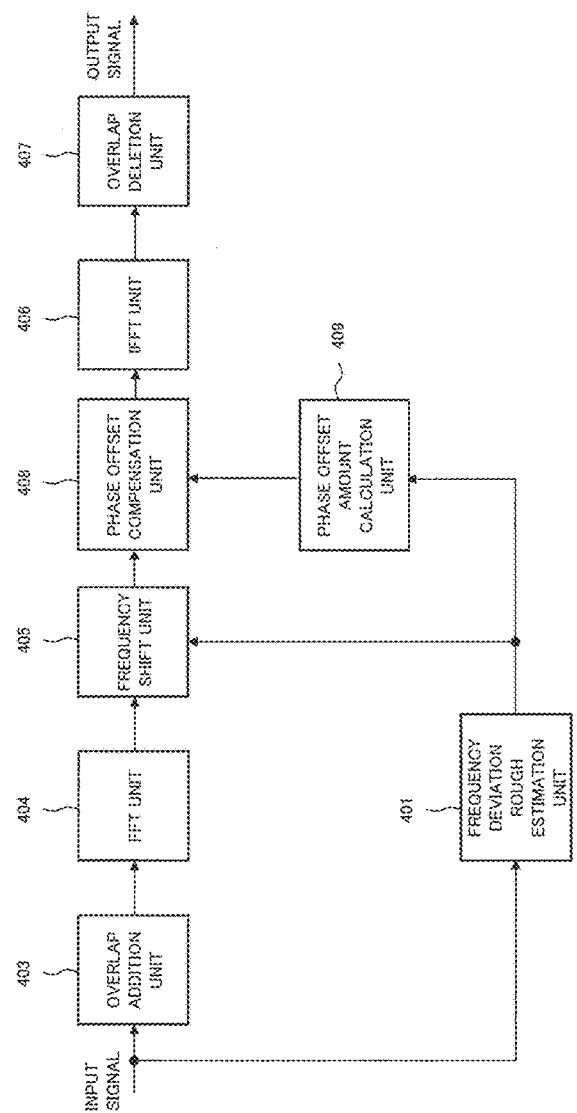
FIG. 9 is a block diagram illustrating an example configuration of a frequency deviation rough compensation unit according to the first exemplary embodiment.

FIG. 9 is a block diagram illustrating an example configuration of the frequency deviation rough compensation unit 202 according to the first exemplary embodiment. As described above, the frequency deviation rough compensation unit 202 according to the first exemplary embodiment includes the phase offset compensation unit 408 and the phase offset amount calculation unit 409.

In the frequency deviation rough compensation unit 202, the frequency deviation rough estimation unit 401 sends a frequency deviation estimated value, as an amount of frequency deviation compensation, to the frequency shift unit 405 and to the phase offset amount calculation unit 409.

Definitions are now provided as follows: $\Delta f_n$ represents the amount of frequency deviation compensation in the FDE process block n; $\Delta f_{n+1}$ represents the amount of frequency deviation compensation in the FDE process block n+1; and $\Delta f = \Delta f_{n+1} - \Delta f_n$ represents change in an amount of frequency deviation compensation. Then, $\Delta f$ can be expressed by the following Mathematical Expression 1 with fs, $N_{FFT}$, and n, which denote a sampling rate, an FFT/IFFT windows size, and an integer, respectively.

$$\Delta f = \Delta f_{n+1} - \Delta f_n = \frac{f_s}{N_{FFT}} n \quad \text{[Mathematical Expression 1]}$$

In addition, a phase offset between the data at the end of an output block for the FDE process block n and the data at the beginning of an output block for the FDE process block n+1 can be calculated according to Mathematical Expression 2:

$$\Delta \phi = 2\pi \Delta f \frac{N_{overlap}/2}{f_s} = \pi \frac{N_{overlap}}{N_{FFT}} n \quad \text{[Mathematical Expression 2]}$$

Mathematical Expression 2 represents that the signal phase advances by $\Delta f$ in the FDE process block n+1.

The phase offset amount calculation unit 409 calculates a phase offset $\Delta\phi$ based on the circuit parameters having a frequency deviation compensation amount sent from the frequency deviation rough estimation unit 401, an FFT/IFFT window size, and an overlap size, and then sends the calculated phase offset to the phase offset compensation unit 408.

The phase offset compensation unit 408 compensates for a phase offset caused by change in the amount of frequency deviation compensation, by inversely (counterclockwise) rotating the phase of data included in the FDE process block n+1 by the phase offset $\Delta\phi$.

Figure 10:
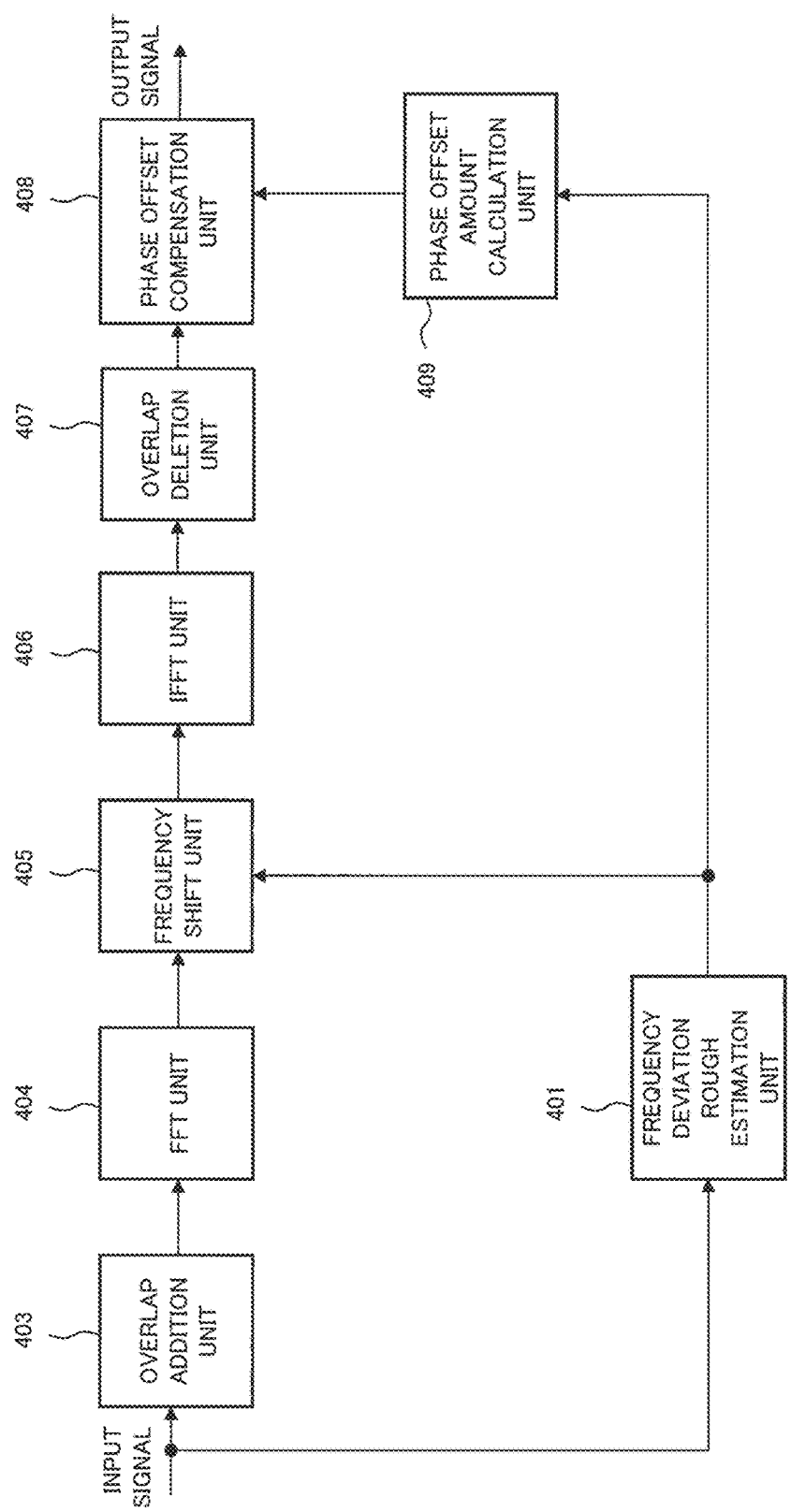
FIG. 10 is a block diagram illustrating another example configuration of the frequency deviation rough compensation unit according to the first exemplary embodiment.

The frequency deviation rough compensation unit 202 illustrated in FIG. 9 is configured so that the phase offset compensation unit 408 performs phase rotation on frequency-domain data; however, the unit 202 may alternatively be configured, as shown in FIG. 10, so that the phase offset compensation unit 408 performs phase rotation on time-domain data.

As described above, according to the first exemplary embodiment, the frequency deviation rough compensation unit 202 includes the phase offset compensation unit 408 and the phase offset amount calculation unit 409, which makes it possible to compensate for a phase offset caused by change in an amount of frequency deviation compensation. Accordingly, the first exemplary embodiment provides the effect of preventing errors that may be caused by a phase offset, even when an amount of frequency deviation compensation is dynamically changed during FDE-based frequency deviation compensation.

Second Exemplary Embodiment

A second exemplary embodiment will now be described with reference to the drawings. Some descriptions are omitted here for configurations of the second exemplary embodiment shared with the first exemplary embodiment.

Note that the frequency deviation compensation means corresponds to the frequency shift unit 405. Also note that the frequency deviation calculation means corresponds to the frequency deviation rough estimation unit 401. Also note that the compensation amount calculation means corresponds to the frequency shift amount calculation unit 410.

Figure 11:
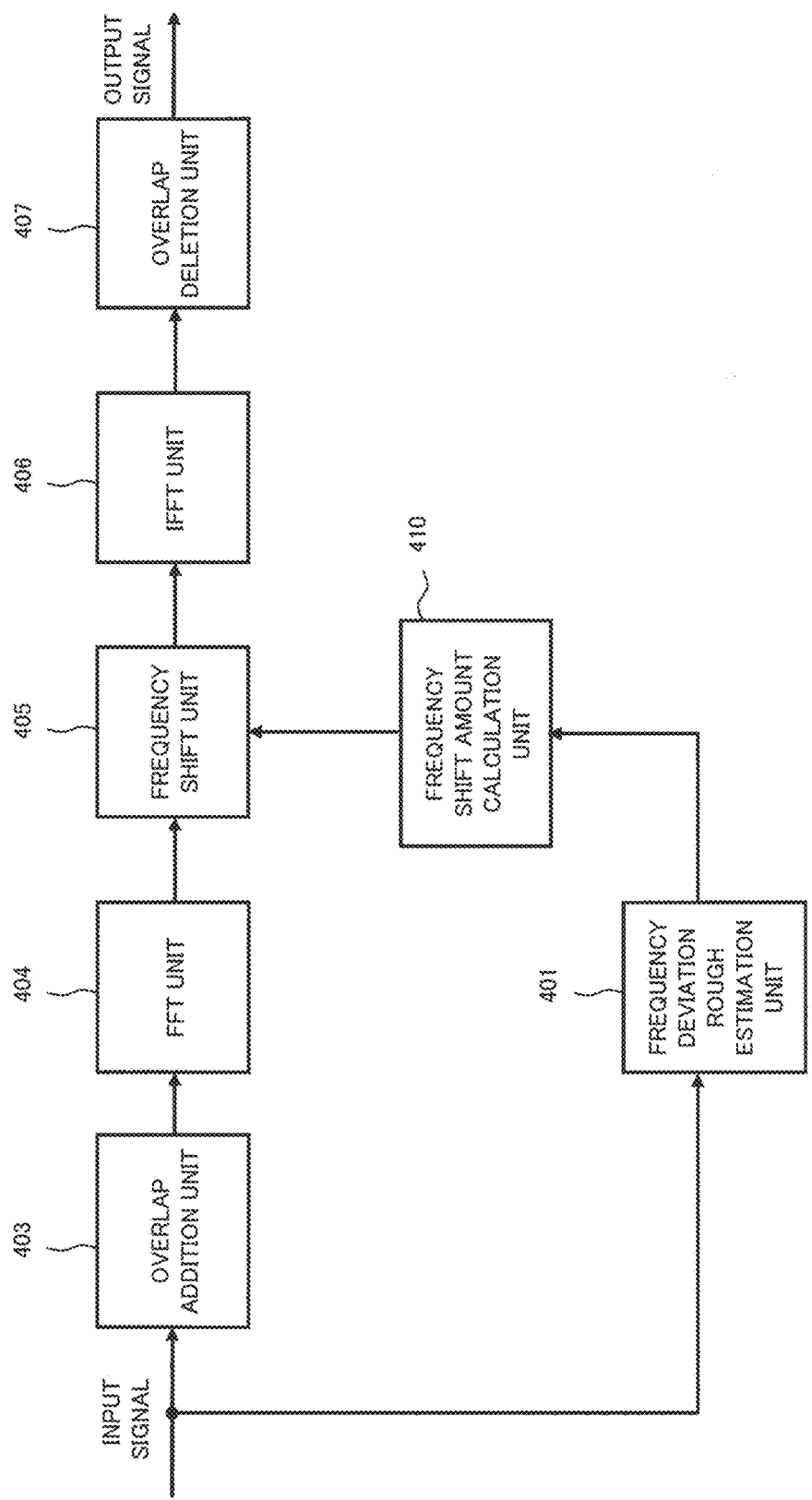
FIG. 11 is a block diagram illustrating an example configuration of a frequency deviation rough compensation unit according to a second exemplary embodiment.

FIG. 11 is a block diagram illustrating an example configuration of the frequency deviation rough compensation unit 202 according to the second exemplary embodiment. According to the second exemplary embodiment, the frequency deviation rough compensation unit 202 includes a frequency shift amount calculation unit 410 as illustrated in FIG. 11.

The frequency shift amount calculation unit 410 calculates, based on the amount of frequency deviation compensation received from the frequency deviation rough estimation unit 401 and according to Mathematical Expression 2, a phase offset caused by change in an amount of frequency deviation compensation, and approximates the phase offset at a value $\Delta\phi'$ that is closest to the phase offset among integer multiples of $2\pi$. The frequency shift amount calculation unit 410 calculates an amount of change $\Delta f'$ in the amount of frequency deviation compensation corresponding to $\Delta\phi'$ by using Mathematical Expression 2, as well as calculating a new amount of frequency deviation compensation $\Delta f_{n+1}'=f_n+\Delta f'$ by using Mathematical Expression 1, and then notifies the frequency shift unit 405 of $\Delta f_{n+1}'$ as an amount of frequency deviation compensation.

The frequency shift unit 405 performs frequency shift by using the amount of frequency deviation compensation $\Delta f_{n+1}'$ notified by the frequency shift amount calculation unit 410, on the other hand, compensation for a phase offset is unnecessary because the phase offset is an integer multiple of $2\pi$, which is equivalent to zero. Any difference between $\Delta f_{n+1}$ and $\Delta f_{n+1}'$ will be compensated for by the frequency deviation compensation units 206-1 and 206-2 situated in a later stage.

In addition, assuming that the FFT/IFFT window size is 1,024 and the overlap size is 256, the phase offset is always an integer multiple of $\pi/4$. If n is a multiple of 8, the phase offset is an integer multiple of $2\pi$, and thus the phase offset is equivalent to zero. Accordingly, it can be seen that, as far as the amount of frequency deviation compensation $\Delta f_n$ is limited beforehand to a product of a value obtained by dividing the sampling rate by the FFT/IFFT window size and a multiple of 8, the phase offset is always an integer multiple of $2\pi$ representing no problem caused by a phase offset, in accordance with Mathematical Expression 1.

Figure 12:
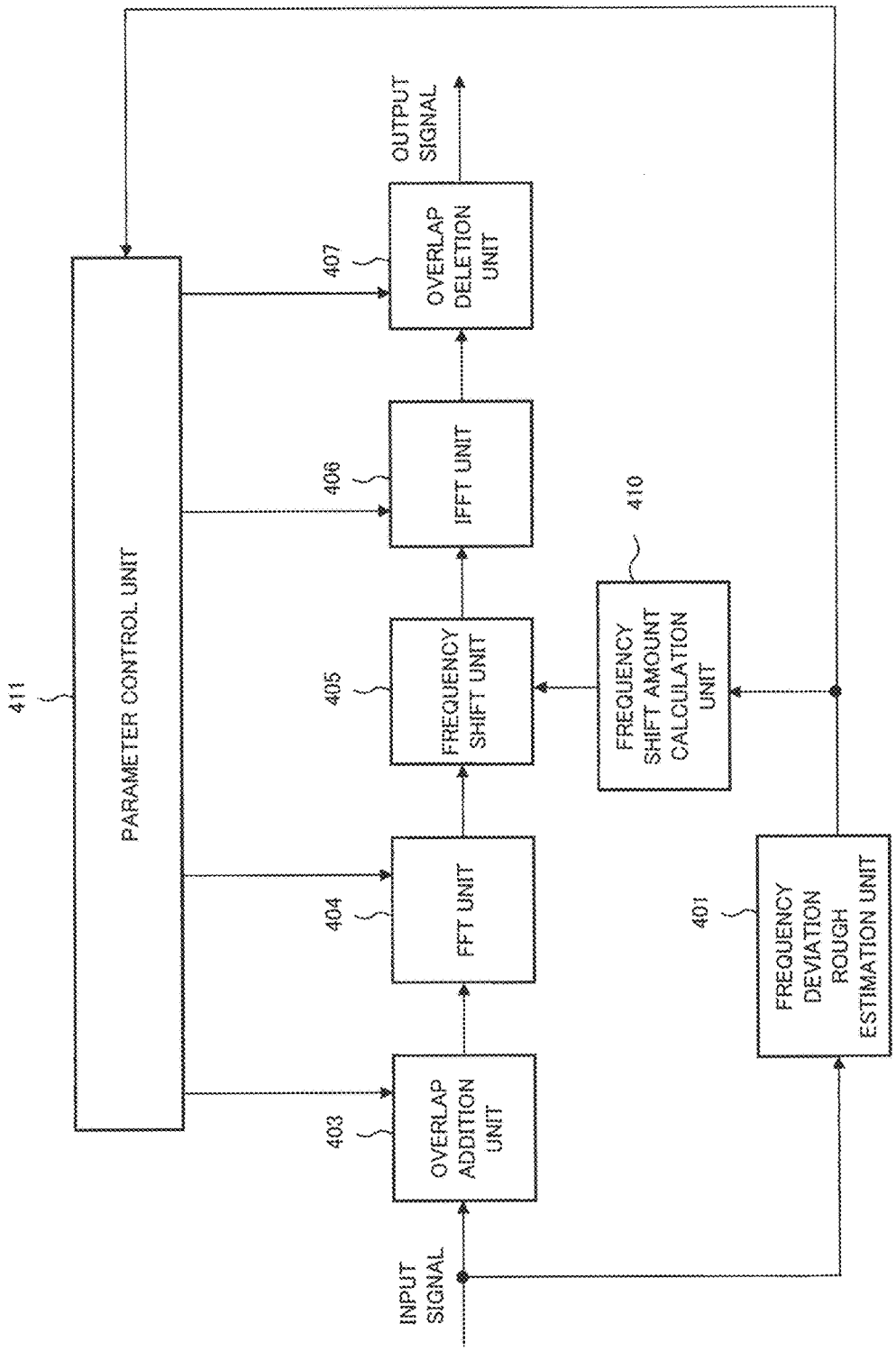
FIG. 12 is a block diagram illustrating another example configuration of the frequency deviation rough compensation unit according to the second exemplary embodiment.

While the above description deals with the configuration where an amount of frequency deviation compensation is adjusted so as to make a phase offset be an integer multiple of $2\pi$, a configuration illustrated in FIG. 12 further allows for deletion of a difference between $\Delta f_{n+1}$ and $\Delta f_{n+1}'$. In the configuration illustrated in FIG. 12, the parameter control unit 411 controls the FFT/IFFT window size along with the overlap size to delete a difference between $\Delta f_{n+1}$ and $\Delta f_{n+1}'$.

With reference to FIG. 12, the parameter control unit 411 receives an amount of frequency deviation compensation calculated by the frequency deviation rough estimation unit 401, determines a suitable FFT/IFFT window size based on the amount of frequency deviation compensation, and notifies the FFT unit 404 and/or the IFFT unit 406 of the determined size. Upon notification, the FFT unit 404 and/or the IFFT unit 406 adjust the FFT/IFFT window size to the value as notified.

In addition, the parameter control unit 411 receives an amount of frequency deviation compensation calculated by the frequency deviation rough estimation unit 401, determines a suitable overlap size based on the amount of frequency deviation compensation, and notifies the overlap addition unit 403 of the determined size. Upon notification, the overlap addition unit 403 adjusts the overlap size to the value as notified.

The example illustrated in FIG. 12 allows for deletion of a difference between $\Delta f_{n+1}$ and $\Delta f_{n+1}'$ by adjusting the FFT/IFFT window size and the overlap size based on an amount of frequency deviation compensation.

As described above, the second exemplary embodiment makes it possible to compensate for a phase offset caused by change in an amount of frequency deviation compensation. Accordingly, the second exemplary embodiment provides the effect of preventing errors that may be caused by a phase offset, even when the amount of frequency deviation compensation is dynamically changed during FDE-based frequency deviation compensation.

Third Exemplary Embodiment

A third exemplary embodiment will now be described with reference to the drawings. Some descriptions are omitted here for configurations of the third exemplary embodiment shared with the first and second exemplary embodiments.

Figure 13:
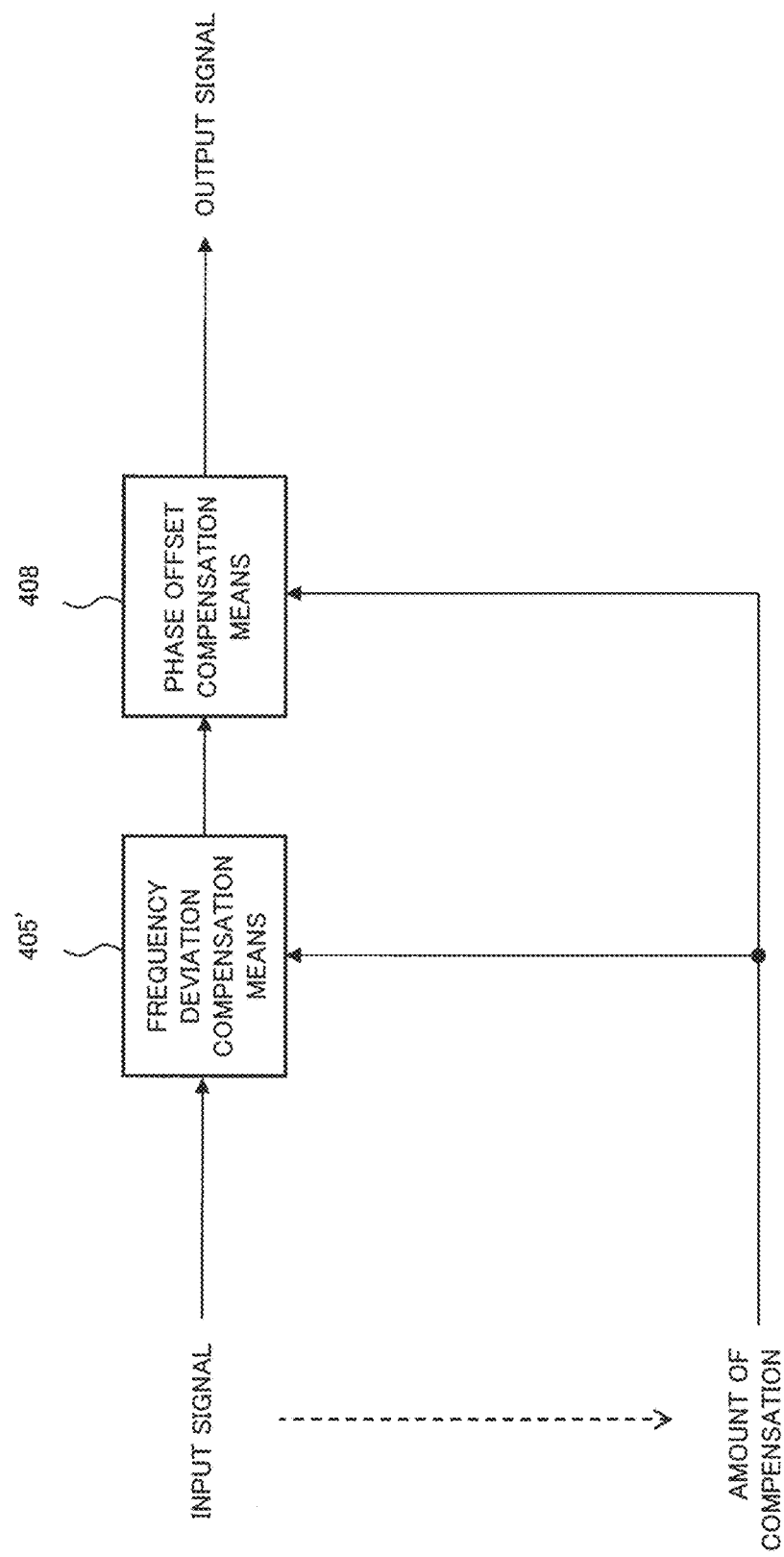
FIG. 13 is a block diagram illustrating an example configuration of a frequency deviation rough compensation unit according to a third exemplary embodiment.

FIG. 13 is a block diagram illustrating an example configuration of the frequency deviation rough compensation unit 202 according to the third exemplary embodiment. As illustrated in FIG. 13, the frequency deviation rough compensation unit 202 includes frequency deviation compensation means 405' and phase offset compensation means 408.

Note that the frequency deviation compensation means 405' corresponds to the frequency shift unit 405 according to the first and second exemplary embodiments.

The frequency deviation compensation means 405' compensates for a frequency deviation in a frequency-domain signal. Note that the frequency deviation compensation means 405' may compensate for a frequency deviation in the signal by, for example, shifting the signal in the frequency direction.

The phase offset compensation means 408 compensates for a phase offset caused to a signal due to change in an amount of compensation during frequency compensation. Note that the phase offset compensation means 408 compensates for the phase offset by inversely rotating the phase of the signal by the amount of phase offset.

As described above, according to the third exemplary embodiment, the frequency deviation rough compensation unit 202 includes the phase offset compensation unit 408, which makes it possible to compensate for a phase offset caused by change in an amount of frequency deviation compensation. Accordingly, the third exemplary embodiment provides the effect of preventing errors that may be caused by a phase offset, even when an amount of frequency deviation compensation is dynamically changed during FDE-based frequency deviation compensation.

Fourth Exemplary Embodiment

A fourth exemplary embodiment will now be described with reference to the drawings. Some descriptions are omitted here for configurations of the fourth exemplary embodiment shared with the first to third exemplary embodiments.

Figure 14:
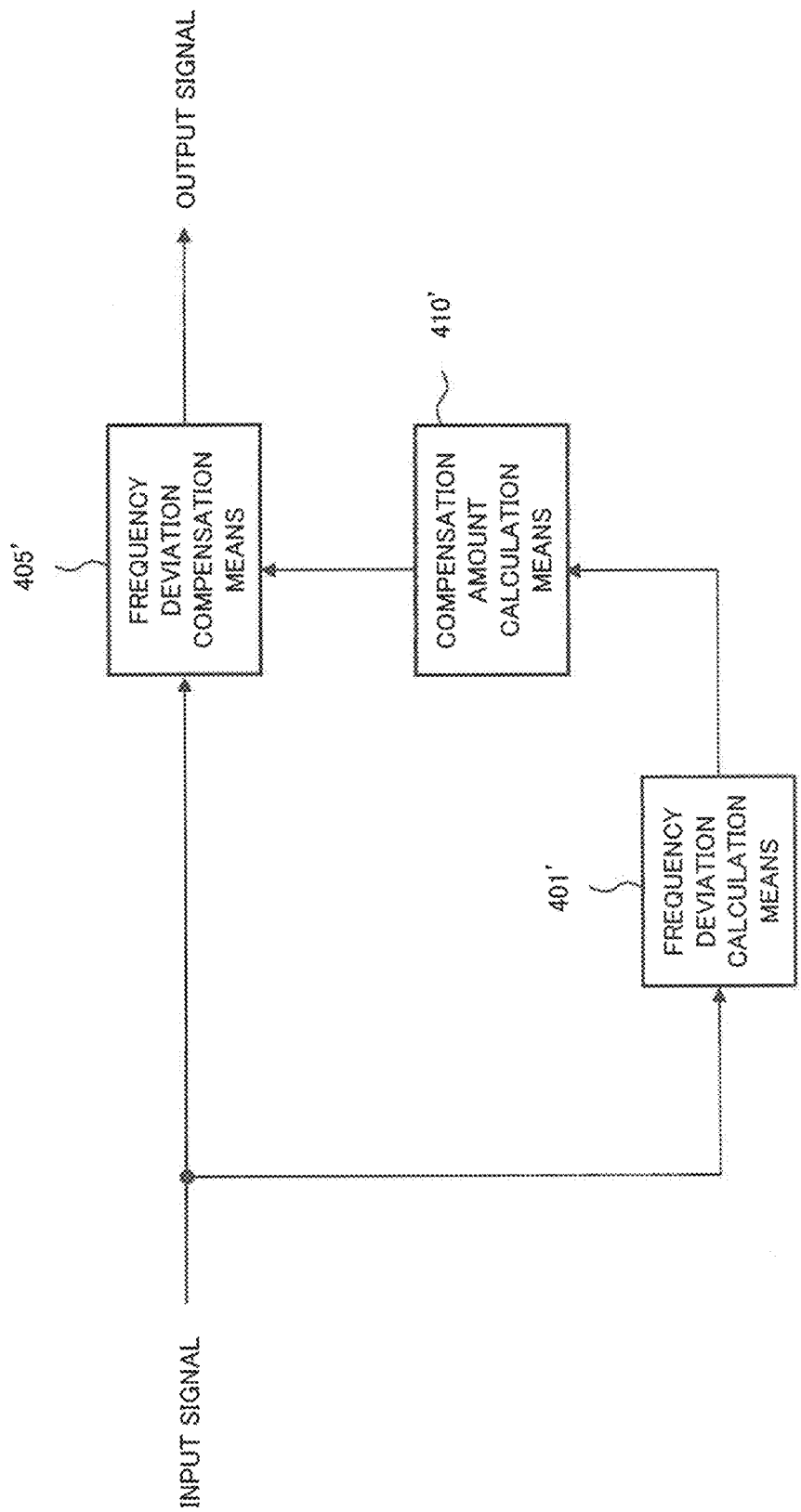
FIG. 14 is a block diagram illustrating an example configuration of a frequency deviation rough compensation unit according to a fourth exemplary embodiment.

FIG. 14 is a block diagram illustrating an example configuration of the frequency deviation rough compensation unit 202 according to the fourth exemplary embodiment. As illustrated in FIG. 14, the frequency deviation rough compensation unit 202 includes frequency deviation compensation means 405', frequency deviation calculation means 401', and compensation amount calculation means 410'.

Note that the frequency deviation compensation means 405' corresponds to the frequency shift unit 405 according to the first and second exemplary embodiments. Also note that the frequency deviation calculation means 401' corresponds to the frequency deviation rough estimation unit 401 according to the first and second exemplary embodiments. Also note that the compensation amount calculation means 410' corresponds to the frequency shift amount calculation unit 410 according to the first and second exemplary embodiments.

The frequency deviation calculation means 401' calculates an amount of frequency deviation compensation in a frequency-domain signal.

The compensation amount calculation means 410' adjusts the amount of compensation so that a phase offset caused to the signal due to change in the amount of compensation calculated by the frequency deviation calculation means 410' is a predetermined amount. The predetermined amount may be, for example, an integer multiple of $2\pi$.

The frequency deviation compensation means 405' compensates for a frequency deviation in the signal based on the adjusted amount of compensation. Note that the frequency deviation compensation means 405' may compensate for a frequency deviation in the signal by, for example, shifting the signal in the frequency direction.

As described above, the fourth exemplary embodiment makes it possible to compensate for a phase offset caused by change in an amount of frequency deviation compensation. Accordingly, the fourth exemplary embodiment provides the effect of preventing errors that may be caused by a phase offset, even when an amount of frequency deviation compensation is dynamically changed during FDE-based frequency deviation compensation.

Fifth Exemplary Embodiment

Figure 15:
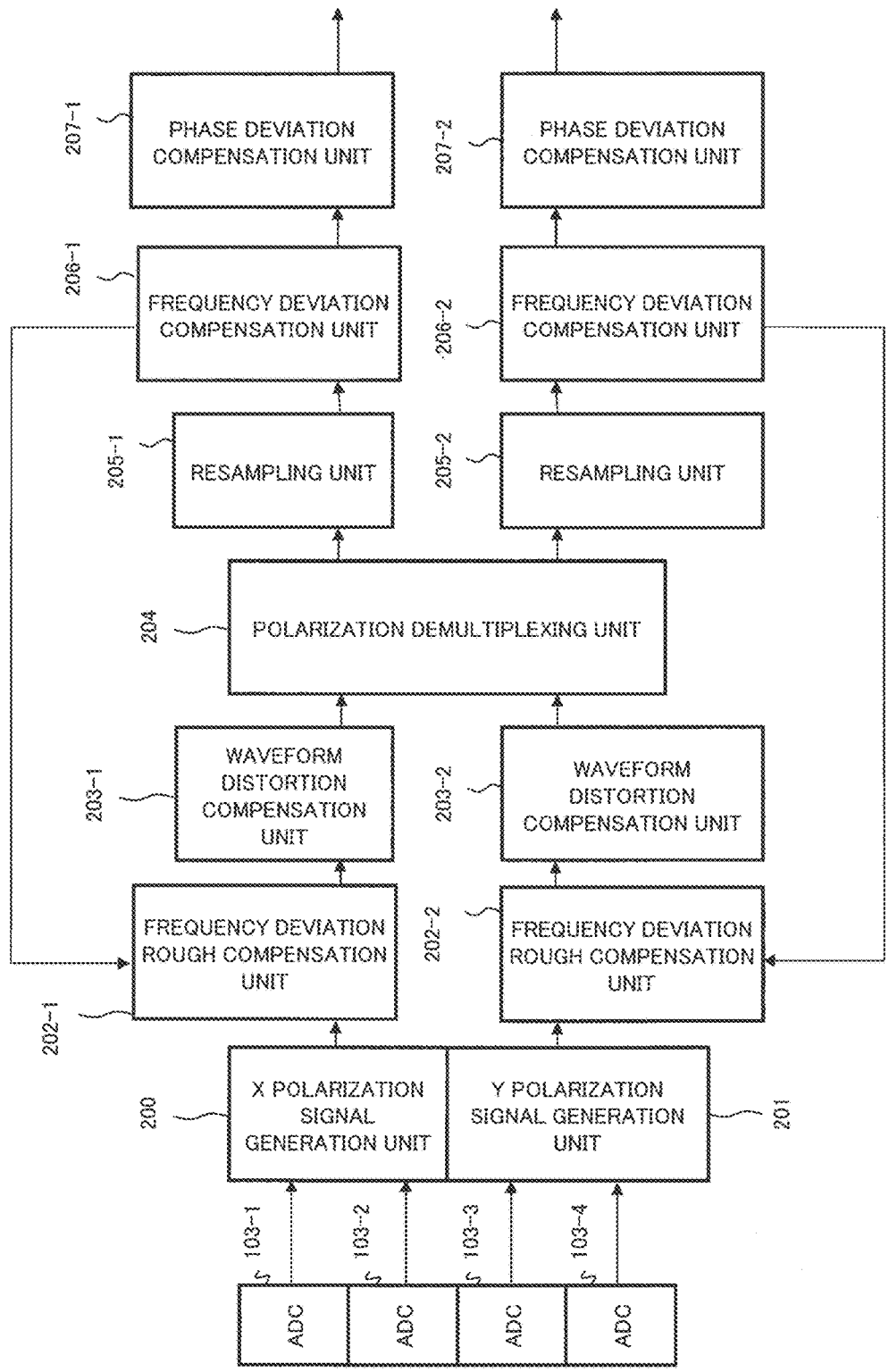
FIG. 15 is a block diagram illustrating an example configuration of a digital coherent optical receiver according to a fifth exemplary embodiment.

A fifth exemplary embodiment will now be described with reference to the drawings. FIG. 15 is a block diagram illustrating a configuration of an optical receiver according to the fifth exemplary embodiment. In the optical receiver according to the fifth exemplary embodiment, a frequency deviation estimated value is notified to the frequency deviation rough compensation unit 202-1 by the frequency deviation compensation unit 206-1. A frequency deviation estimated value is also notified to the frequency deviation rough compensation unit 202-2 by the frequency deviation compensation unit 206-2. These are the difference from the other exemplary embodiments described above.

Figure 16:
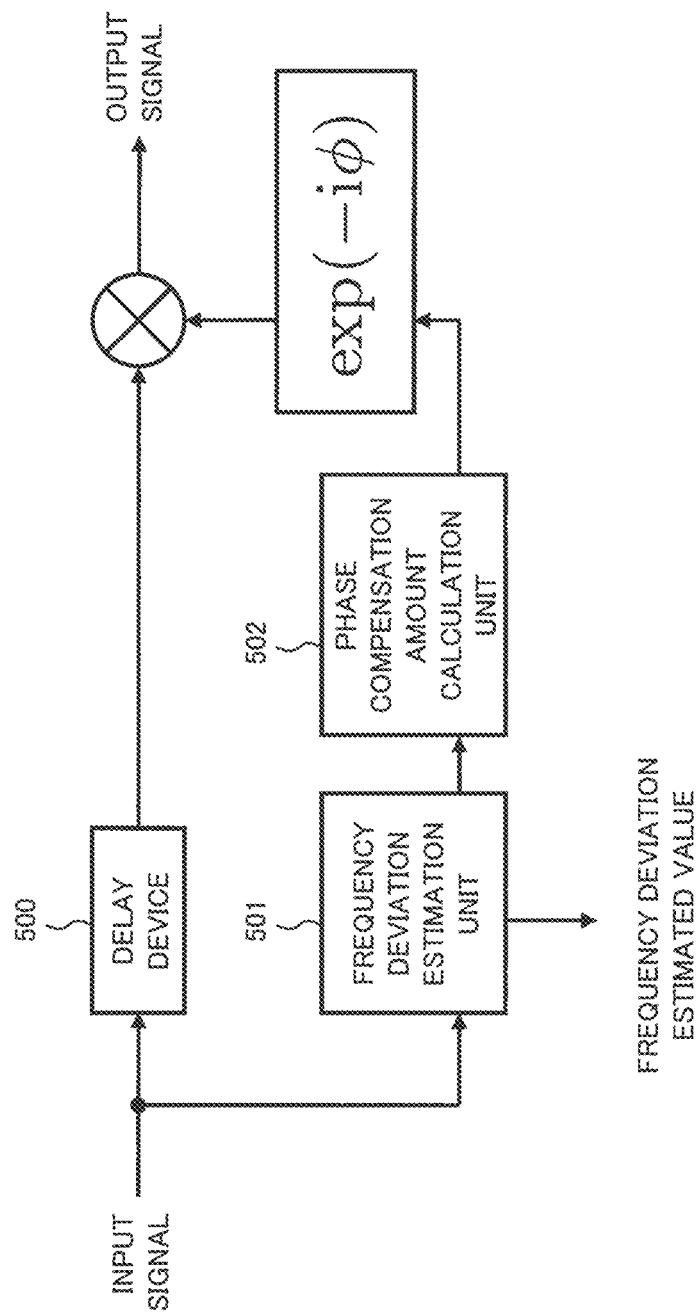
FIG. 16 is a block diagram illustrating an example configuration of a frequency deviation compensation unit according to the fifth exemplary embodiment.

FIG. 16 is a block diagram illustrating an example configuration of the frequency deviation compensation unit 206-1 or 206-2 according to the fifth exemplary embodiment. The frequency deviation estimation unit 501 included in the frequency deviation compensation unit according to the present exemplary embodiment notifies a frequency deviation estimated value to the phase compensation amount calculation unit 502 and to either the frequency deviation rough compensation unit 202-1 or 202-2.

Figure 17:
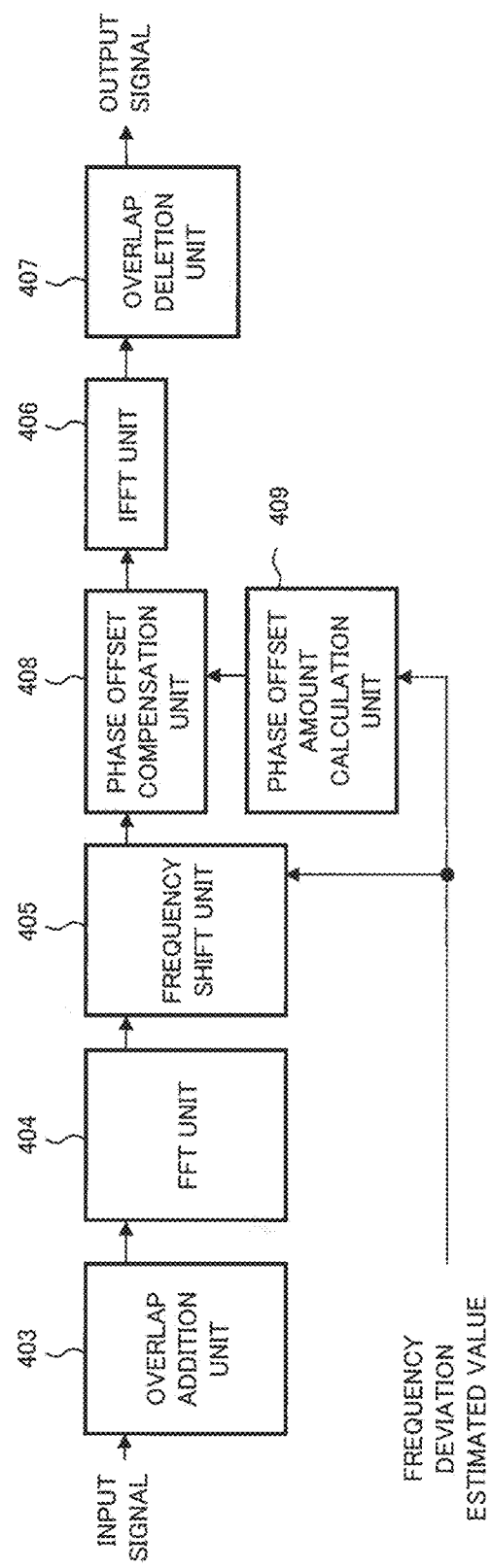
FIG. 17 is a block diagram illustrating an example configuration of a frequency deviation rough compensation unit according to the fifth exemplary embodiment.

FIG. 17 is a block diagram illustrating a configuration of the frequency deviation rough compensation units 202-1 and 202-2 according to the fifth exemplary embodiment. The frequency deviation rough compensation units 202-1 and 202-2 according to the present exemplary embodiment do not include the frequency deviation rough estimation unit 401. In the other exemplary embodiments above, the frequency shift unit 405 and the phase offset amount calculation 409 are notified of a frequency deviation estimated value from the frequency deviation rough estimation unit 401, whereas in the present exemplary embodiment, they are notified of a frequency deviation estimated value from the frequency deviation compensation unit 206-1 or 206-2. The frequency shift unit 405 and the phase offset amount calculation unit 409 performs their respective functions by using the frequency deviation estimated value.

Similarly, functional blocks such as the frequency shift amount calculation unit 410, the parameter control unit 411, which are notified of a frequency deviation estimated value from the frequency deviation rough estimation unit 401, may perform their respective function by using a frequency deviation estimated value notified from the frequency deviation compensation unit 206-1 or 206-2.

As described above, even if the optical receiver is configured not to include the frequency rough estimation unit in the frequency deviation rough compensation unit, it is still possible to roughly compensate for a frequency deviation by using a configuration where a frequency deviation estimated value calculated by the frequency deviation compensation unit located in a later stage is fed back. Note that the present exemplary embodiment may be applied to the case where, as a frequency deviation estimated value fed back from the frequency deviation compensation unit to the frequency deviation rough compensation unit, for example, an average of frequency deviation estimated values respectively calculated by the two frequency deviation compensation units is fed back. As described so far, the above-described exemplary embodiments do not depend on from which unit a frequency deviation estimated value is notified.

Sixth Exemplary Embodiment

A sixth exemplary embodiment will now be described. According to the sixth exemplary embodiment, a computer, central processing unit (CPU), micro-processing unit (MPU), or the like for an optical receiver executes the software (program) that implements functions of the above-described individual exemplary embodiments.

According to the sixth exemplary embodiment, an optical receiver obtains the software (program) that implements functions of the above-described individual exemplary embodiments via any of various storage media such as CD-R (Compact Disc Recordable) or via a network. A program obtained by the optical receiver or a storage medium storing the program constitutes an exemplary embodiment. Note that the software (program) may be stored, for example, in advance in a predetermined storage unit included in the optical receiver.

The computer, CPU, MPU, or the like for the optical receiver reads out a program code from the obtained software (program) and executes it. Accordingly, the optical receiver performs the same processes as those for an optical receiver according to the above-described individual exemplary embodiments.

According to the sixth exemplary embodiment, the present invention may be applied to such uses as a program to be implemented on a computer, CPU, MPU, or the like for an optical receiver.

The present invention has been described with reference to exemplary embodiments, but the invention is not limited to these embodiments. Various modifications of the present invention that could be understood by those skilled in the art may be made to configurations or details of the invention within the scope of the invention.

The whole or part of the above embodiments can be described as, but is not limited to, the following supplementary notes.

[Supplementary Note 1]

A frequency deviation compensation scheme comprising:

frequency deviation compensation means which compensates for a frequency deviation in a frequency-domain signal; and phase offset compensation means which compensates for a phase offset caused to the signal due to change in an amount of compensation during the frequency compensation.

[Supplementary Note 2]

The frequency deviation compensation scheme according to Supplementary Note 1, wherein the frequency deviation compensation means compensates for the frequency deviation in the signal by shifting the signal in the frequency direction, and wherein the phase offset compensation means compensates for the phase offset by inversely rotating the phase of the signal by the phase offset.

[Supplementary Note 3]

The frequency deviation compensation scheme according to Supplementary Note 1 or 2, further comprising:

phase offset calculation means which calculates a phase offset caused to the signal due to change in an amount of compensation during the frequency compensation, wherein the phase offset compensation means compensates for the phase offset of the signal based on the calculated phase offset.

[Supplementary Note 4]

The frequency deviation compensation scheme according to Supplementary Note 3, further comprising:

a frequency deviation calculation unit which calculates an amount of compensation for the frequency deviation in the signal, wherein the frequency deviation compensation means compensates for the frequency deviation in the signal based on the calculated amount of compensation, and wherein the phase offset calculation means calculates the phase offset based on the calculated amount of compensation.

[Supplementary Note 5]

The frequency deviation compensation scheme according to Supplementary Note 3 or 4, wherein the phase offset calculation means calculates the phase offset based on the amount of compensation for the frequency deviation, an FFT/IFFT window size, and an overlap size.

[Supplementary Note 6]

The frequency deviation compensation scheme according to any one of Supplementary Notes 1 to 5, wherein the phase offset compensation means compensates for the phase offset by inversely rotating the phase of the signal in a frequency domain by the phase offset.

[Supplementary Note 7]

The frequency deviation compensation scheme according to any one of Supplementary Notes 1 to 5, wherein the phase offset compensation means compensates for the phase offset by inversely rotating the phase of the signal in a time domain by the phase offset.

[Supplementary Note 8]

A frequency deviation compensation scheme comprising:

frequency deviation calculation means which calculates an amount of compensation for a frequency deviation in a frequency-domain signal;

compensation amount calculation means which adjusts the amount of compensation so that a phase offset caused to the signal due to change in the calculated amount of compensation is a predetermined amount; and frequency deviation compensation means which compensates for the frequency deviation in the signal based on the adjusted amount of compensation.

[Supplementary Note 9]

The frequency deviation compensation scheme according to Supplementary Note 8, wherein the predetermined amount is an integer multiple of $2\pi$.

[Supplementary Note 10]

The frequency deviation compensation scheme according to Supplementary Note 8 or 9, further comprising:

parameter control means which adjusts at least one of an FFT/IFFT window size and an overlap size so that a phase offset caused to the signal due to change in the calculated amount of compensation is a predetermined amount.

[Supplementary Note 11]

The frequency deviation compensation scheme according to any one of Supplementary Notes 8 to 10, wherein the frequency deviation calculation means calculates a first amount of compensation as the amount of compensation for the frequency deviation, and wherein the parameter control means adjusts an FFT/IFFT window size and an overlap size so that an FFT/IFFT window size is a positive number multiple of an overlap size; and sets a second amount of compensation to a value closest to the first amount of compensation among values obtained by dividing a sampling rate by an FFT/IFFT window size and multiplying the resultant value by an integer multiple of twice the positive number, and wherein the frequency deviation compensation means compensates for the frequency deviation in the signal by shifting the signal in the frequency direction based on the second amount of compensation.

[Supplementary Note 12]

A method for compensating for a frequency deviation, the method comprising:

compensating for a frequency deviation in a frequency-domain signal; and compensating for a phase offset caused to the signal due to change in an amount of compensation during the frequency compensation.

[Supplementary Note 13]

The method for compensating for a frequency deviation according to Supplementary Note 12, wherein the frequency deviation in the signal is compensated for by shifting the signal in the frequency direction, and wherein the phase offset is compensated for by inversely rotating the phase of the signal by the calculated phase offset.

[Supplementary Note 14]

The method for compensating for a frequency deviation according to Supplementary Note 12 or 13, wherein a phase offset caused to the signal due to change in an amount of compensation during the frequency compensation is calculated, and wherein the phase offset of the signal is compensated for based on the calculated phase offset.

[Supplementary Note 15]

The method for compensating for a frequency deviation according to any one of Supplementary Notes 12 to 14, wherein an amount of compensation for a frequency deviation in the signal is calculated, and wherein the frequency deviation in the signal is compensated for based on the calculated amount of compensation, and wherein the phase offset is calculated based on the calculated amount of compensation.

[Supplementary Note 16]

The method for compensating for a frequency deviation according to any one of Supplementary Notes 12 to 15, wherein the phase offset is calculated based on the amount of compensation for the frequency deviation, an FFT/IFFT window size, and an overlap size.

[Supplementary Note 17]

The method for compensating for a frequency deviation according to any one of Supplementary Notes 12 to 16, wherein the phase offset is compensated for by inversely rotating the phase of the signal in a frequency domain by the phase offset.

[Supplementary Note 18]

The method for compensating for a frequency deviation according to any one of Supplementary Notes 12 to 17, wherein the phase offset is compensated for by inversely rotating the phase of the signal in a time domain by the phase offset.

[Supplementary Note 19]

A method for compensating for a frequency deviation, the method comprising:

calculating an amount of compensation for a frequency deviation in a frequency-domain signal;

adjusting the amount of compensation so that a phase offset caused to the signal due to change in the calculated amount of compensation is a predetermined amount; and compensating for the frequency deviation in the signal based on the adjusted amount of compensation.

[Supplementary Note 20]

The method for compensating for a frequency deviation according to Supplementary Note 19, wherein the predetermined amount is an integer multiple of $2\pi$.

[Supplementary Note 21]

The method for compensating for a frequency deviation according to Supplementary Note 19 or 20, wherein at least one of an FFT/IFFT window size and an overlap size is adjusted so that a phase offset caused to the signal due to change in the calculated amount of compensation is a predetermined amount.

[Supplementary Note 22]

The method for compensating for a frequency deviation according any one of Supplementary Notes 19 to 21, wherein a first amount of compensation is calculated as an amount of compensation for the frequency deviation, and wherein an FFT/IFFT window size and an overlap size are adjusted so that an FFT/IFFT window size is a positive number multiple of an overlap size, and wherein a second amount of compensation is set to a value closest to the first amount of compensation among values obtained by dividing a sampling rate by an FFT/IFFT window size and multiplying the resultant value by an integer multiple of twice the positive number, and wherein the frequency deviation in the signal is compensated for by shifting the signal in the frequency direction based on the second amount of compensation.

[Supplementary Note 23]

A program causing a computer to execute the processes of:

compensating for a frequency deviation in a frequency-domain signal; and compensating for a phase offset caused to the signal due to change in an amount of compensation during the frequency compensation.

[Supplementary Note 24]

The program according to Supplementary Note 23, comprising the processes of:

compensating for the frequency deviation in the signal by shifting the signal in the frequency direction;

compensating for the phase offset by inversely rotating the phase of the signal by the calculated phase offset.

[Supplementary Note 25]

The program according to Supplementary Note 23 or 24, comprising the processes of:

calculating a phase offset caused to the signal due to change in an amount of compensation during the frequency compensation; and compensating for the phase offset of the signal based on the calculated phase offset.

[Supplementary Note 26]

The program according to any one of Supplementary Notes 23 to 25, comprising the processes of:

calculating an amount of compensation for a frequency deviation in the signal;

compensating for the frequency deviation in the signal based on the calculated amount of compensation; and calculating the phase offset based on the calculated amount of compensation.

[Supplementary Note 27]

The program according to any one of Supplementary Notes 23 to 26, comprising the process of:

calculating the phase offset based on an amount of compensation for the frequency deviation, an FFT/IFFT window size, and an overlap size.

[Supplementary Note 28]

The program according to any one of Supplementary Notes 23 to 27, comprising the process of:

compensating for the phase offset by inversely rotating the phase of the signal in a frequency domain by the phase offset.

[Supplementary Note 29]

The program according to any one of Supplementary Notes 23 to 28, comprising the process of:

compensating for the phase offset by inversely rotating the phase of the signal in a time domain by the phase offset.

[Supplementary Note 30]

A program comprising the processes of:

calculating an amount of compensation for a frequency deviation in a frequency-domain signal;

adjusting the amount of compensation so that a phase offset caused to the signal due to change in the calculated amount of compensation is a predetermined amount; and compensating for the frequency deviation in the signal based on the adjusted amount of compensation.

[Supplementary Note 31]

The program according to Supplementary Note 30, wherein the predetermined amount is an integer multiple of $2\pi$.

[Supplementary Note 32]

The program according to Supplementary Note 30 or 31, comprising the process of:

adjusting at least one of an FFT/IFFT window size and an overlap size so that a phase offset caused to the signal due to change in the calculated amount of compensation is a predetermined amount.

[Supplementary Note 33]

The program according to any one of Supplementary Notes 30 to 32, comprising the processes of:

calculating a first amount of compensation as an amount of compensation for the frequency deviation;

adjusting an FFT/IFFT window size and an overlap size so that an FFT/IFFT window size is a positive number multiple of an overlap size;

setting a second amount of compensation to a value closest to the first amount of compensation among values obtained by dividing a sampling rate by an FFT/IFFT window size and multiplying the resultant value by an integer multiple of twice the positive number; and compensating for the frequency deviation in the signal by shifting the signal in the frequency direction based on the second amount of compensation.

[Supplementary Note 34]

A storage medium storing a program for causing a computer to execute the processes of:

compensating for a frequency deviation in a frequency-domain signal;

calculating a phase offset caused to the signal due to change in an amount of compensation during the frequency compensation; and compensating for the phase offset of the signal based on the calculated phase offset.

The present application claims priority based on Japanese Patent Application No. 2013-171048 filed on Aug. 21, 2013, the entire disclosure of which is incorporated herein.

REFERENCE SIGNS LIST

100 Local oscillation light generation unit
101 90° hybrid
102-1, 102-2, 102-3, 102-4 Photo-electric conversion unit
103-1, 103-2, 103-3, 103-4 ADC
104 Digital signal processing unit
200 X polarization signal generation unit
201 Y polarization signal generation unit
202-1, 202-2 Frequency deviation rough compensation unit
203-1, 203-2 Waveform distortion compensation unit
204 Polarization demultiplexing unit
205-1, 205-2 Resampling unit
206-1, 206-2 Frequency deviation compensation unit
207-1, 207-2 Phase deviation compensation unit
300 Delay device
301 Frequency deviation estimation unit
302 Phase compensation amount calculation unit
400 Delay device
401 Frequency deviation rough estimation unit
401' Frequency deviation calculation means
402 Phase compensation amount calculation unit
403 Overlap addition unit
404 FFT unit
405 Frequency shift unit
405' Frequency deviation compensation means
406 IFFT unit
407 Overlap deletion unit
408 Phase offset compensation unit
409 Phase offset calculation amount unit
410 Frequency shift amount calculation unit
410' Compensation amount calculation means
411 Parameter control unit
412 Real part extraction unit
413 Imaginary part extraction unit
414 Low-pass filter
415 Frequency deviation calculation unit

What is claimed is:

1. A frequency deviation compensation scheme comprising:

a frequency deviation compensation processor configured to compensate for a frequency deviation in a frequency-domain signal;

a phase offset calculation processor configured to calculate a phase offset, caused to the frequency-domain signal due to change in an amount of frequency deviation compensation, based on the amount of compensation for the frequency deviation, a fast Fourier transform (FFT)/inverse FFT (IFFT) window size, and an overlap size; and a phase offset compensation processor configured to compensate for the phase offset of the frequency-domain signal based on the calculated phase offset.

2. The frequency deviation compensation scheme according to claim 1, wherein the frequency deviation compensation processor is further configured to compensate for the frequency deviation in the frequency-domain signal by shifting the frequency-domain signal in the frequency direction, and wherein the phase offset compensation processor is further configured to compensate for the phase offset by inversely rotating the phase of the frequency-domain signal by the phase offset.

3. The frequency deviation compensation scheme according to claim 1, further comprising:

a frequency deviation calculation processor configured to calculate an amount of compensation for the frequency deviation in the frequency-domain signal, wherein the frequency deviation compensation processor is further configured to compensate for the frequency deviation in the frequency-domain signal based on the calculated amount of compensation.

4. A frequency deviation compensation scheme comprising:
a frequency deviation calculation processor configured to calculate an amount of compensation for a frequency deviation in a frequency-domain signal,
a compensation amount calculation processor configured to adjust the amount of compensation so that a phase offset caused to the frequency-domain signal due to change in the calculated amount of compensation is a predetermined amount, and
a frequency deviation compensation processor configured to compensate for the frequency deviation in the frequency-domain signal based on the adjusted amount of compensation,
wherein the predetermined amount is an integer multiple of $2\pi$.

5. The frequency deviation compensation scheme according to claim 4, further comprising a parameter control processor configured to adjust at least one of a fast Fourier transform (FFT)/inverse FFT (IFFT) window size and an overlap size so that a phase offset caused to the frequency-domain signal due to change in the calculated amount of compensation is the predetermined amount.

6. The frequency deviation compensation scheme according to claim 5,
wherein the frequency deviation calculation processor is further configured to calculate a first amount of compensation as the amount of compensation for the frequency deviation,
wherein the parameter control processor is further configured to:
adjust the FFT/IFFT window size and the overlap size so that the FFT/IFFT window size is a positive number multiple of the overlap size,
set a second amount of compensation to a value closest to the first amount of compensation among values obtained by dividing a sampling rate by the FFT/IFFT window size and multiplying the resultant value by an integer multiple of twice the positive number, and
wherein the frequency deviation compensation processor is further configured to compensate for the frequency deviation in the frequency-domain signal by shifting the frequency-domain signal in the frequency direction based on the second amount of compensation.

7. A method for compensating for a frequency deviation, the method comprising:
compensating for a frequency deviation in a frequency-domain signal;
calculating a phase offset, caused to the frequency-domain signal due to change in an amount of frequency deviation compensation, based on the amount of compensation for the frequency deviation, a fast Fourier transform (FFT)/inverse FFT (IFFT) window size, and an overlap size; and
compensating for a phase offset of the frequency-domain signal based on the calculated phase offset.

8. The method for compensating for a frequency deviation compensation according to claim 7,
wherein the compensating for the frequency deviation in the frequency-domain signal comprises shifting the frequency-domain signal in the frequency direction, and
wherein the compensating for the phase offset comprises inversely rotating the phase of the frequency-domain signal by the phase offset.

9. The method for compensating for a frequency deviation compensation according to claim 7, further comprising:
calculating an amount of compensation for the frequency deviation in the frequency-domain signal,
wherein the compensating for the frequency deviation in the frequency-domain signal comprises compensating based on the calculated amount of compensation.

10. A method for compensating for a frequency deviation, the method comprising:
calculating an amount of compensation for a frequency deviation in a frequency-domain signal,
adjusting the amount of compensation so that a phase offset caused to the frequency-domain signal due to change in the calculated amount of compensation is a predetermined amount, and
compensating for the frequency deviation in the frequency-domain signal based on the adjusted amount of compensation,
wherein the predetermined amount is an integer multiple of $2\pi$.

11. The method for compensating for a frequency deviation compensation according to claim 10, further comprising:
adjusting at least one of a fast Fourier transform (FFT)/inverse FFT (IFFT) window size and an overlap size so that a phase offset caused to the frequency-domain signal due to change in the calculated amount of compensation is the predetermined amount.

12. The method for compensating for a frequency deviation compensation according to claim 11, further comprises,
calculating a first amount of compensation as the amount of compensation for the frequency deviation, wherein the adjusting comprises adjusting the FFT/IFFT window size and the overlap size so that the FFT/IFFT window size is a positive number multiple of the overlap size, and
setting a second amount of compensation to a value closest to the first amount of compensation among values obtained by dividing a sampling rate by the FFT/IFFT window size and multiplying the resultant value by an integer multiple of twice the positive number,
wherein the compensating for the frequency deviation comprises compensating for the frequency deviation in the frequency-domain signal by shifting the frequency-domain signal in the frequency direction based on the second amount of compensation.

* * * * *